US012641602B2

(12) United States Patent
Elshafie et al.

(10) Patent No.: US 12,641,602 B2
(45) Date of Patent: May 26, 2026

(54) PACKET RETRANSMISSION USING A SEMI-PERSISTENT SCHEDULING OCCASION

(71) Applicant: QUALCOMM Incorporated, San Diego, CA (US)

(72) Inventors: Ahmed Elshafie, San Diego, CA (US); Diana Maamari, San Diego, CA (US); Wei Yang, San Diego, CA (US); Seyedkianoush Hosseini, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 674 days.

(21) Appl. No.: 17/938,354

(22) Filed: Oct. 6, 2022

(65) Prior Publication Data

US 2024/0121778 A1 Apr. 11, 2024

(51) Int. Cl.
| | |
|---|---|
| *H04L 1/1812* | (2023.01) |
| *H04W 72/1273* | (2023.01) |
| *H04W 72/23* | (2023.01) |

(52) U.S. Cl.
CPC ....... *H04W 72/1273* (2013.01); *H04L 1/1812* (2013.01); *H04W 72/23* (2023.01)

(58) Field of Classification Search
CPC ..... H04W 72/12; H04W 72/23; H04W 72/11; H04L 1/1812; H04L 1/1819; H04L 1/1822; H04L 1/1845; H04L 1/188; H04L 1/1887
See application file for complete search history.

(56) References Cited

U.S. PATENT DOCUMENTS

| | | | | | |
|---|---|---|---|---|---|
| 11,357,013 | B2 * | 6/2022 | Zhou | .................... | H04L 25/0226 |
| 11,711,806 | B2 * | 7/2023 | Awoniyi-Oteri | ...... | H04L 1/1822 |
| | | | | | 370/329 |
| 2011/0223924 | A1 * | 9/2011 | Lohr | ..................... | H04L 1/1607 |
| | | | | | 370/252 |
| 2018/0124753 | A1 * | 5/2018 | Sun | ........................ | H04L 1/0088 |
| 2018/0160445 | A1 * | 6/2018 | Babaei | ................ | H04W 72/044 |
| 2022/0303948 | A1 * | 9/2022 | Yao | ........................ | H04L 1/1861 |
| 2023/0092206 | A1 * | 3/2023 | Bae | ........................ | H04W 72/23 |
| | | | | | 370/329 |
| 2023/0309090 | A1 * | 9/2023 | Bae | ........................ | H04L 1/1812 |
| 2023/0361917 | A1 * | 11/2023 | Chou | .................... | H04L 5/0053 |
| 2024/0008024 | A1 * | 1/2024 | Jung | ..................... | H04L 1/1812 |
| 2024/0187824 | A1 * | 6/2024 | Wu | ......................... | H04W 4/06 |
| 2025/0024448 | A1 * | 1/2025 | Lee | ..................... | H04W 72/232 |

* cited by examiner

*Primary Examiner* — Marcus Smith

(74) *Attorney, Agent, or Firm* — Harrity & Harrity, LLP

(57) ABSTRACT

Various aspects of the present disclosure generally relate to wireless communication. In some aspects, a mobile station may receive, from a network node, one or more semi-persistent scheduling (SPS) configurations that configure multiple SPS occasions. The mobile station may receive, from the network node, a retransmission of a data packet in an unused SPS occasion, of the multiple SPS occasions. Numerous other aspects are described.

17 Claims, 13 Drawing Sheets

910   Receive, by the mobile station and from a network node, one or more SPS configurations that configure multiple SPS occasions 920   Receive, by the mobile station and from the network node, a retransmission of a data packet in an unused SPS occasion, of the multiple SPS occasions

900

1010  Transmit, by the network node and to a mobile station, one or more SPS configurations that configure multiple SPS occasions 1020  Transmit, by the network node and to the mobile station, a retransmission of a data packet in an unused SPS occasion, of the multiple SPS occasions

1000

PACKET RETRANSMISSION USING A SEMI-PERSISTENT SCHEDULING OCCASION

FIELD OF THE DISCLOSURE

Aspects of the present disclosure generally relate to wireless communication and to techniques and apparatuses for packet retransmission using a semi-persistent scheduling occasion.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a mobile station. The method may include receiving, by the mobile station and from a network node, one or more semi-persistent scheduling (SPS) configurations that configure multiple SPS occasions. The method may include receiving, by the mobile station and from the network node, a retransmission of a data packet in an unused SPS occasion, of the multiple SPS occasions.

Some aspects described herein relate to a method of wireless communication performed by a network node. The method may include transmitting, by the network node and to a mobile station, one or more SPS configurations that configure multiple SPS occasions. The method may include transmitting, by the network node and to the mobile station, a retransmission of a data packet in an unused SPS occasion, of the multiple SPS occasions.

Some aspects described herein relate to a mobile station for wireless communication. The mobile station may include a memory and one or more processors. The one or more processors, based at least in part on information stored in the memory, may be configured to receive, from a network node, one or more SPS configurations that configure multiple SPS occasions. The one or more processors, based at least in part on information stored in the memory, may be configured to receive, from the network node, a retransmission of a data packet in an unused SPS occasion, of the multiple SPS occasions.

Some aspects described herein relate to a network node for wireless communication. The network node may include a memory and one or more processors. The one or more processors, based at least in part on information stored in the memory, may be configured to transmit, to a mobile station, one or more SPS configurations that configure multiple SPS occasions. The one or more processors, based at least in part on information stored in the memory, may be configured to transmit, to the mobile station, a retransmission of a data packet in an unused SPS occasion, of the multiple SPS occasions.

Some aspects described herein relate to a non-transitory computer-readable medium that stores a set of instructions for wireless communication by a mobile station. The set of instructions, when executed by one or more processors of the mobile station, may cause the mobile station to receive, from a network node, one or more SPS configurations that configure multiple SPS occasions. The set of instructions, when executed by one or more processors of the mobile station, may cause the mobile station to receive, from the network node, a retransmission of a data packet in an unused SPS occasion, of the multiple SPS occasions.

Some aspects described herein relate to a non-transitory computer-readable medium that stores a set of instructions for wireless communication by a network node. The set of instructions, when executed by one or more processors of the network node, may cause the network node to transmit, to a mobile station, one or more SPS configurations that configure multiple SPS occasions. The set of instructions, when executed by one or more processors of the network node, may cause the network node to transmit, to the mobile station, a retransmission of a data packet in an unused SPS occasion, of the multiple SPS occasions.

Some aspects described herein relate to an apparatus for wireless communication. The apparatus may include means for receiving, from a network node, one or more SPS configurations that configure multiple SPS occasions. The apparatus may include means for receiving, from the network node, a retransmission of a data packet in an unused SPS occasion, of the multiple SPS occasions.

Some aspects described herein relate to an apparatus for wireless communication. The apparatus may include means for transmitting, to a mobile station, one or more SPS configurations that configure multiple SPS occasions. The apparatus may include means for transmitting, to the mobile station, a retransmission of a data packet in an unused SPS occasion, of the multiple SPS occasions.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
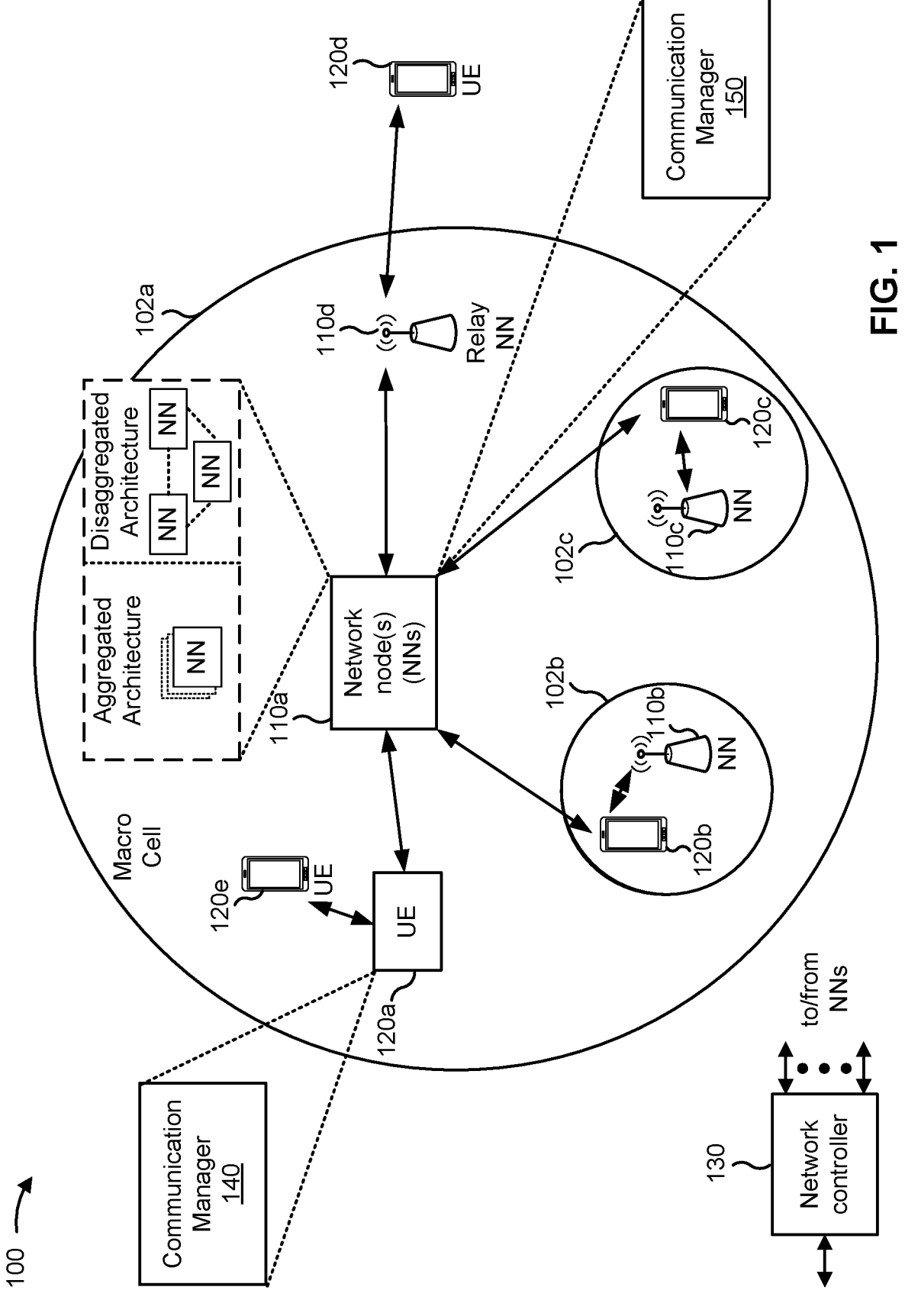
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may correspond to a mobile station described elsewhere herein. The UE 120 (e.g., mobile station) may include a communication manager 140.

As described in more detail elsewhere herein, the communication manager 140 may receive, from a network node 110, one or more semi-persistent scheduling (SPS) configurations that configure multiple SPS occasions; and receive, from the network node 110, a retransmission of a data packet in an unused SPS occasion, of the multiple SPS occasions. Additionally, or alternatively, the communication manager 140 may perform one or more other operations described herein.

In some aspects, the network node 110 may include a communication manager 150. As described in more detail elsewhere herein, the communication manager 150 may transmit, to a mobile station, one or more SPS configurations that configure multiple SPS occasions; and transmit, to the mobile station, a retransmission of a data packet in an unused SPS occasion, of the multiple SPS occasions. Additionally, or alternatively, the communication manager 150 may perform one or more other operations described herein.

As indicated above, FIG. 1 is provided as an example. Other examples may differ from what is described with regard to FIG. 1.

Figure 2:
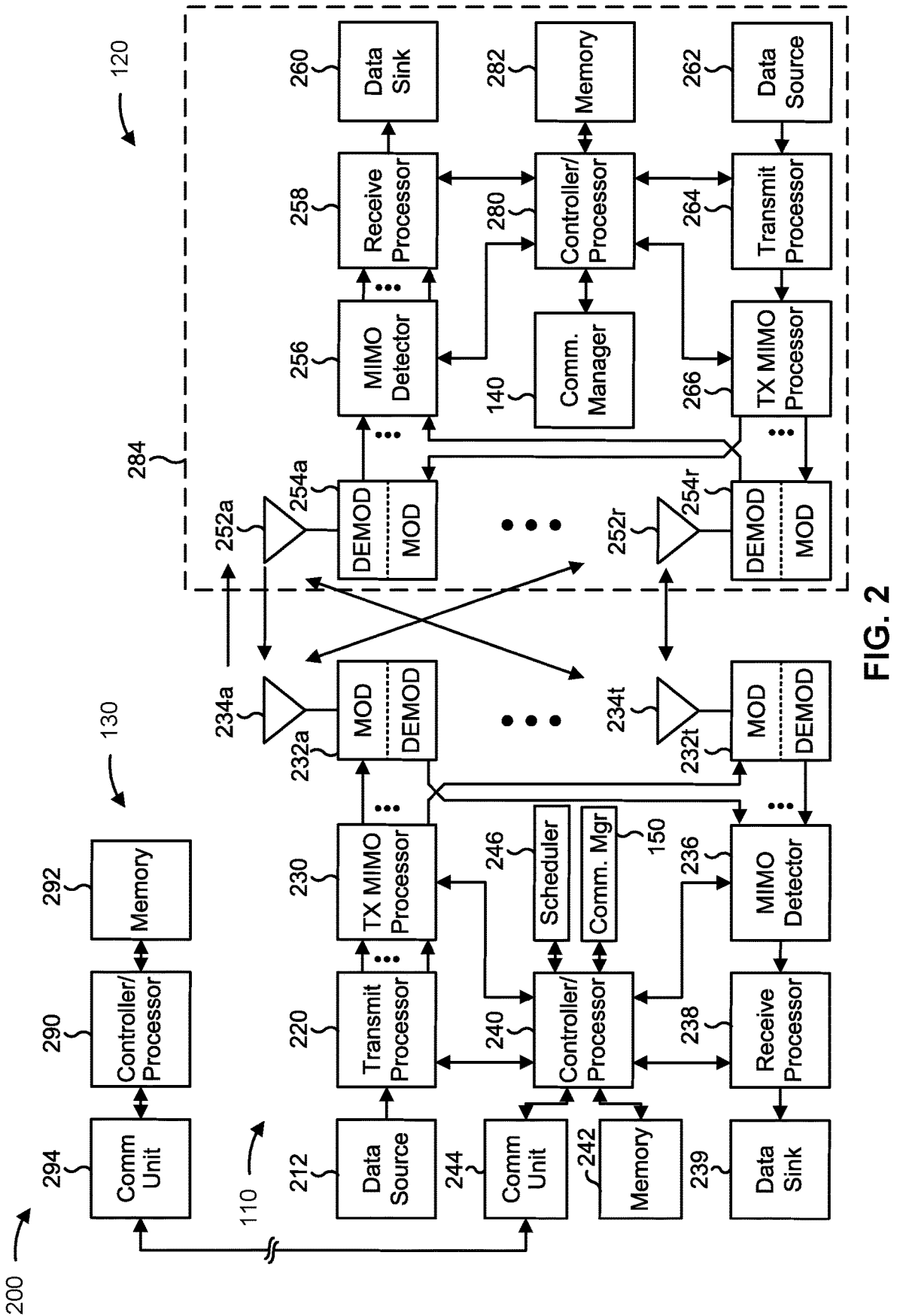
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-12).

The controller/processor 240 of the network node 110, the controller/processor 280 of the UE 120, and/or any other component(s) of FIG. 2 may perform one or more techniques associated with packet retransmission using a semi-persistent scheduling occasion, as described in more detail elsewhere herein. In some aspects, the mobile station described herein is the UE 120, is included in the UE 120, or includes one or more components of the UE 120 shown in FIG. 2. The controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the mobile station (e.g., UE 120) includes means for receiving, by the mobile station and from a network node, one or more SPS configurations that configure multiple SPS occasions; and/or means for receiving, by the mobile station and from the network node, a retransmission of a data packet in an unused SPS occasion, of the multiple SPS occasions. In some aspects, the means for the mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, by the network node and to a mobile station, one or more SPS configurations that configure multiple SPS occasions; and/or means for transmitting, by the network node and to the mobile station, a retransmission of a data packet in an unused SPS occasion, of the multiple SPS occasions. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
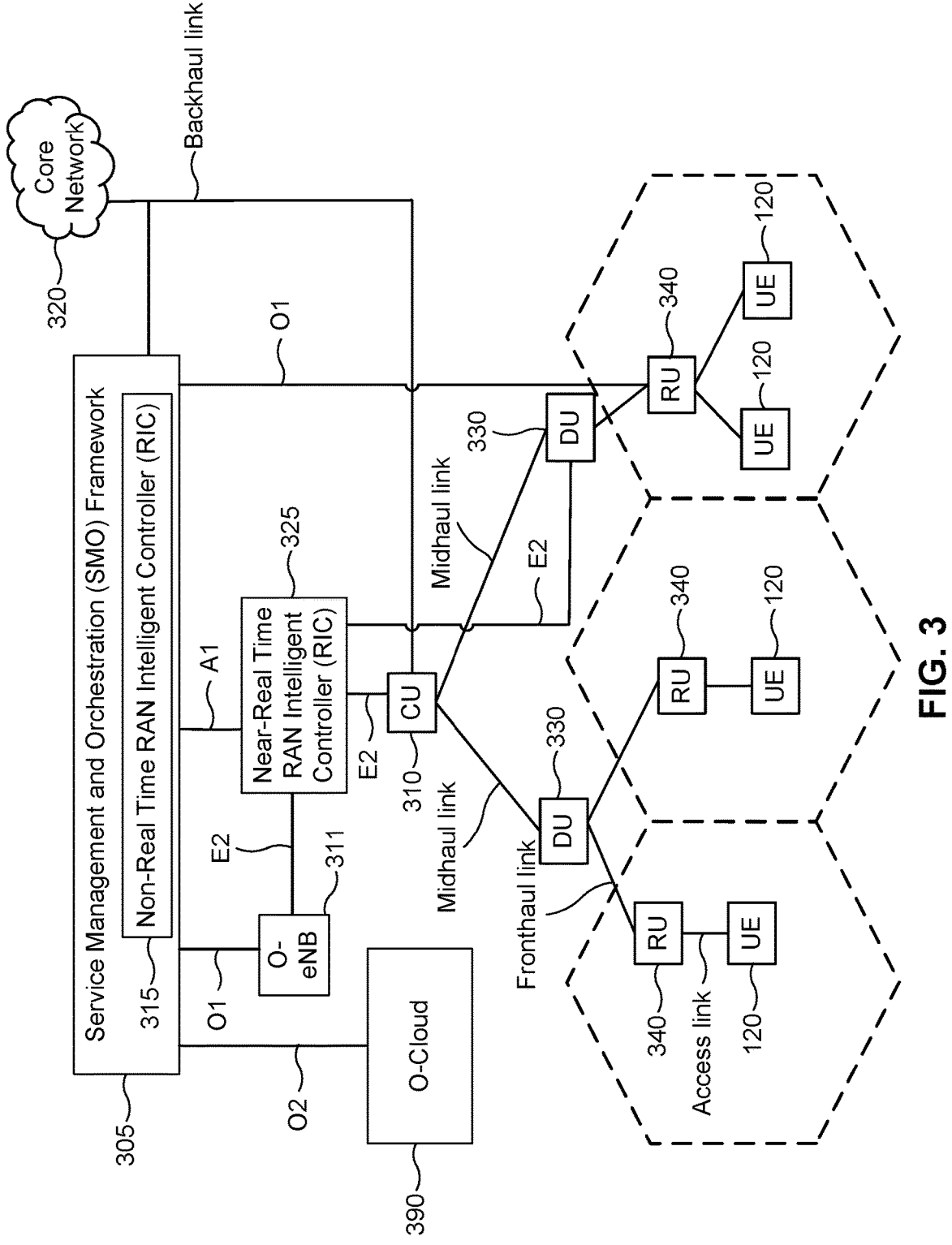
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT MC 325 and may be received at the SMO Framework 305 or the Non-RT MC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
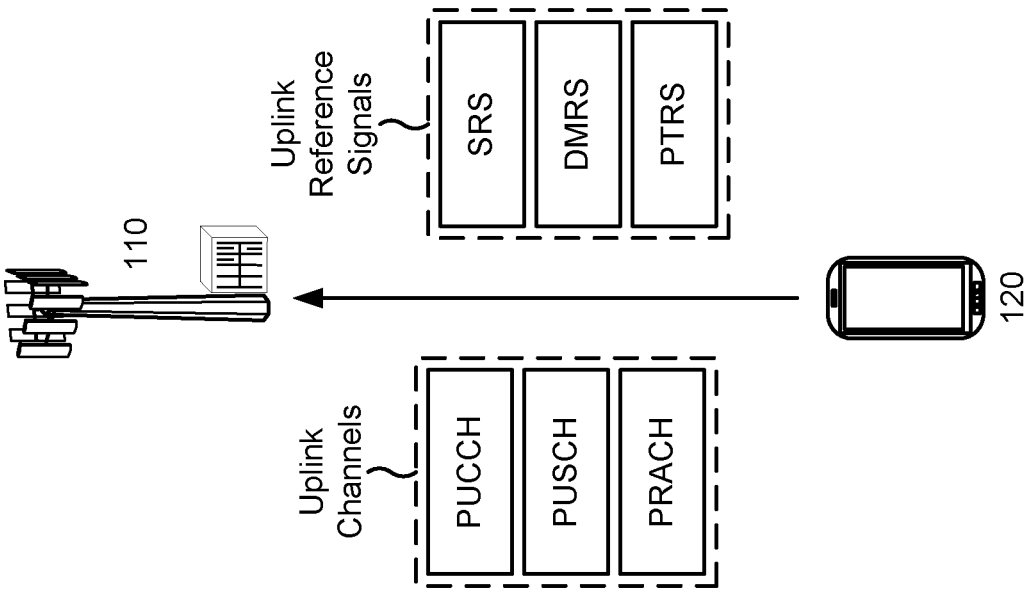
FIG. 4 is a diagram illustrating an example of physical channels and reference signals in a wireless network, in accordance with the present disclosure.
Figure 4:
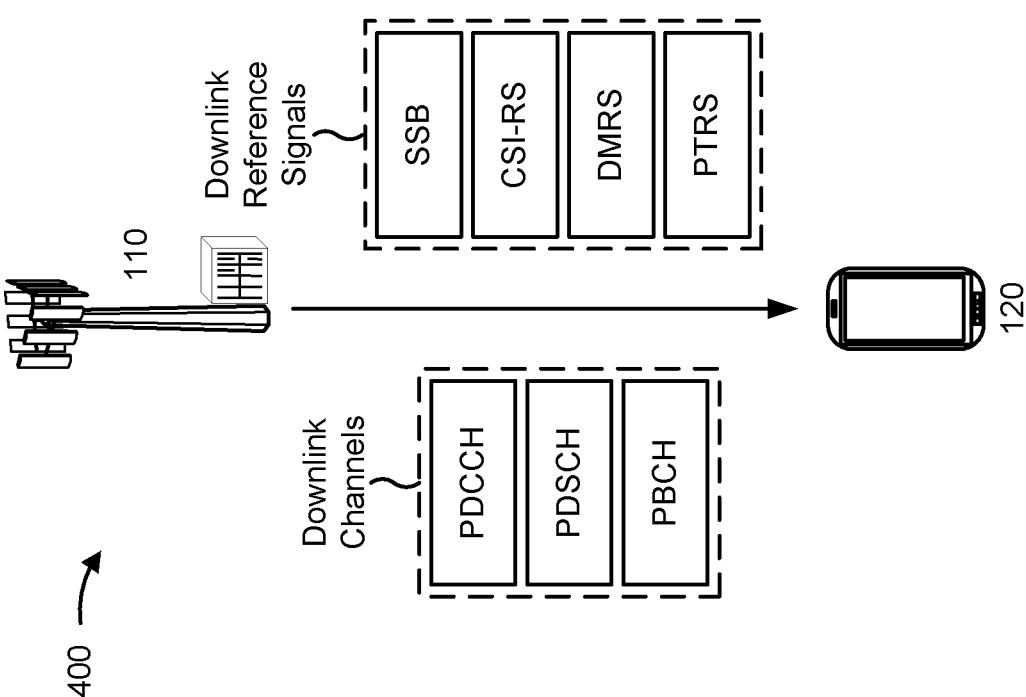

FIG. 4 is a diagram illustrating an example 400 of physical channels and reference signals in a wireless network, in accordance with the present disclosure. As shown in FIG. 4, downlink channels and downlink reference signals may carry information from a network node 110 to a UE 120, and uplink channels and uplink reference signals may carry information from a UE 120 to a network node 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the network node 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 110 may configure a set of CSI-RSs for the UE 120, and the UE 120 may measure the configured set of CSI-RSs. Based at least in part on the measurements, the UE 120 may perform channel estimation and may report channel estimation parameters to the network node 110 (e.g., in a CSI report), such as a CQI, a precoding matrix indicator (PMI), a CSI-RS resource indicator (CRI), a layer indicator (LI), a rank indicator (RI), or an RSRP, among other examples. The network node 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network node 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring network nodes in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the network node 110 may then calculate a position of the UE 120 based on the RSTD measurements reported by the UE 120.

An SRS may carry information used for uplink channel estimation, which may be used for scheduling, link adaptation, precoder selection, or beam management, among other examples. The network node 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network node 110 may measure the SRSs, may perform channel estimation based at least in part on the measurements, and may use the SRS measurements to configure communications with the UE 120.

In some cases, one or more of the above-described channels and/or reference signals may be transmitted via periodic resources, such as via resources associated with an SPS communication. Examples of SPS communications are described in more detail below in connection with FIG. 5.

As indicated above, FIG. 4 is provided as an example. Other examples may differ from what is described with regard to FIG. 4.

Figure 5:
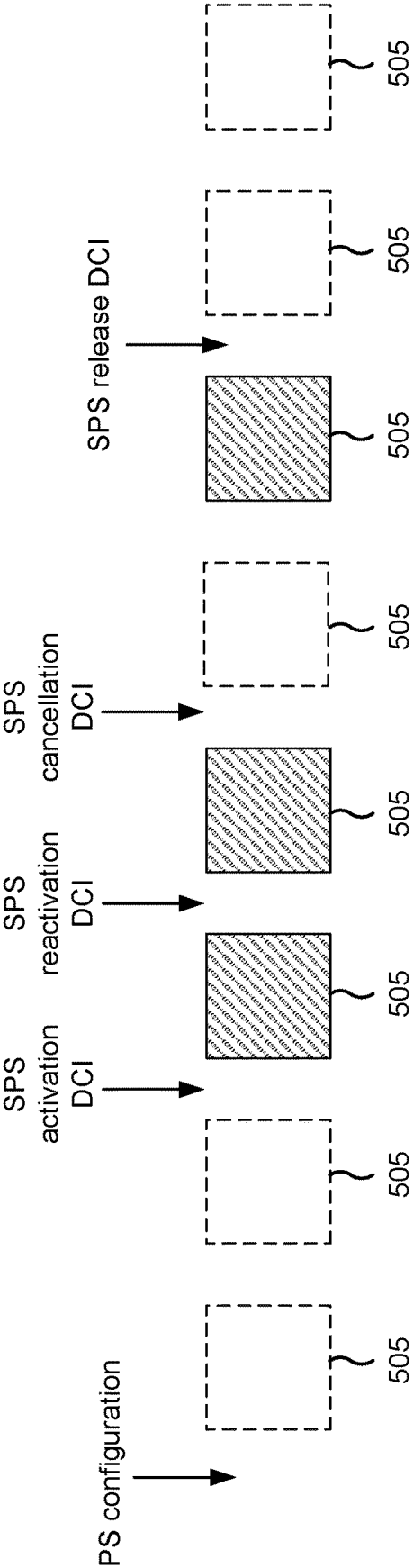
FIG. 5 is a diagram illustrating an example of a downlink semi-persistent scheduling communication, in accordance with the present disclosure.

FIG. 5 is a diagram illustrating an example 500 of a downlink SPS communication, in accordance with the present disclosure. SPS communications may include periodic downlink communications that are configured for a UE 120, such that a network node 110 does not need to transmit (e.g., directly or via one or more network nodes) separate DCI to schedule each downlink communication, thereby conserving signaling overhead.

As shown in example 500, a UE 120 may be configured with an SPS configuration for SPS communications. For example, the UE 120 may receive the SPS configuration via an RRC message transmitted by a network node 110 (e.g., directly or via one or more network nodes 110). The SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions 505 for the UE 120. The SPS configuration may also configure hybrid automatic repeat request (HARQ)-ACK (HARQ-ACK) feedback resources for the UE 120 to transmit HARQ-ACK feedback for SPS PDSCH communications received in the SPS occasions 505. For example, the SPS configuration may indicate a PDSCH-to-HARQ feedback timing value, which may be referred to as a K1 value in a wireless communication standard (e.g., a 3GPP standard).

The network node 110 may transmit SPS activation DCI to the UE 120 (e.g., directly or via one or more network nodes 110) to activate the SPS configuration for the UE 120. The network node 110 may indicate, in the SPS activation DCI, communication parameters, such as an MCS, a resource block (RB) allocation, and/or antenna ports, for the SPS PDSCH communications to be transmitted in the scheduled SPS occasions 505. The UE 120 may begin monitoring the SPS occasions 505 based at least in part on receiving the SPS activation DCI. For example, beginning with a next scheduled SPS occasion 505 subsequent to receiving the SPS activation DCI, the UE 120 may monitor the scheduled SPS occasions 505 to decode PDSCH communications using the communication parameters indicated in the SPS activation DCI. The UE 120 may refrain from monitoring configured SPS occasions 505 prior to receiving the SPS activation DCI.

The network node 110 may transmit SPS reactivation DCI to the UE 120 (e.g., directly or via one or more network nodes 110) to change the communication parameters for the SPS PDSCH communications (e.g., to change one or more of the MCS, the RB allocation, and/or the antenna ports, for the SPS PDSCH communications to be transmitted in the scheduled SPS occasions 505). Based at least in part on receiving the SPS reactivation DCI, the UE 120 may begin monitoring the scheduled SPS occasions 505 using the communication parameters indicated in the SPS reactivation DCI. For example, beginning with a next scheduled SPS occasion 505 subsequent to receiving the SPS reactivation DCI, the UE 120 may monitor the scheduled SPS occasions 505 to decode PDSCH communications based on the communication parameters indicated in the SPS reactivation DCI.

In some cases, such as when the network node 110 does not have downlink traffic to transmit to the UE 120, the network node 110 may transmit SPS cancellation DCI to the UE 120 (e.g., directly or via one or more network nodes) to temporarily cancel or deactivate one or more subsequent SPS occasions 505 for the UE 120. The SPS cancellation DCI may deactivate only a subsequent one SPS occasion 505 or a subsequent N SPS occasions 505 (where N is an integer). SPS occasions 505 after the one or more (e.g., N) SPS occasions 505 subsequent to the SPS cancellation DCI may remain activated. Based at least in part on receiving the SPS cancellation DCI, the UE 120 may refrain from monitoring the one or more (e.g., N) SPS occasions 505 subsequent to receiving the SPS cancellation DCI. As shown in example 500, the SPS cancellation DCI cancels one subsequent SPS occasion 505 for the UE 120. The UE 120 may skip monitoring the N SPS occasions 505 following reception of the SPS cancellation DCI. After the SPS occasion 505 (or N SPS occasions) subsequent to receiving the SPS cancellation DCI, the UE 120 may automatically resume monitoring the scheduled SPS occasions 505.

The network node 110 may transmit SPS release DCI to the UE 120 (e.g., directly or via one or more network nodes 110) to deactivate the SPS configuration for the UE 120. The UE 120 may stop monitoring the scheduled SPS occasions 505 based at least in part on receiving the SPS release DCI. For example, the UE 120 may refrain from monitoring any scheduled SPS occasions 505 until another SPS activation DCI is received by the UE 120. Whereas the SPS cancellation DCI may deactivate only a subsequent one SPS occasion 505 or a subsequent N SPS occasions 505, the SPS release DCI deactivates all subsequent SPS occasions 505 for a given SPS configuration for the UE 120 until the given SPS configuration is activated again by a new SPS activation DCI.

Due to the low latency and reduced signaling overhead associated with SPS communications, SPS-based scheduling may be beneficial for certain latency-critical communications, such as extended reality (XR) communications. For example, XR communications may be associated with stringent packet delay budgets (PDBs) may benefit from using an SPS configuration. More particularly, as compared to dynamic grant communications, SPS communications reduce the signaling overhead of a scheduling DCI, resulting in reduced latency and thus permitting XR downlink packet transmissions to meet the PDB. Moreover, traffic generated by XR applications may be quasi-periodic, and thus may be well suited for SPS communications. However, retransmission of SPS PDSCH communications is currently treated as a dynamic PDSCH, which thus requires large overhead signaling to schedule PDSCH retransmissions. Accordingly, using SPS communications for XR applications or the like may still require large overhead for retransmitting data packets, resulting in increased latency, reduced throughput, high power, computing, and network resource consumption, and overall inefficient usage of network resources.

Some techniques and apparatuses described herein enable retransmission of an SPS PDSCH communication or similar communication in an unused or otherwise skipped SPS occasion. For example, in some aspects, a mobile station (e.g., a UE 120) may receive one or more SPS configurations that configure multiple SPS occasions, such as the SPS occasions 505 described above. In some aspects, a network node (e.g., network node 110) may retransmit a data packet or the like (e.g., a PDSCH communication) using an otherwise unused or skipped SPS occasion, such as the SPS occasion 505 shown following the SPS cancellation DCI in FIG. 5. By utilizing an otherwise unused or skipped SPS occasion for retransmitting a data packet, signaling overhead and resource consumption associated with SPS PDSCH retransmissions may be reduced, leading to reduced latency, increased throughout, decreased power, computing, and network resource consumption, and overall more efficient usage of network resources.

As indicated above, FIG. 5 is provided as an example. Other examples may differ from what is described with respect to FIG. 5.

Figure 6:
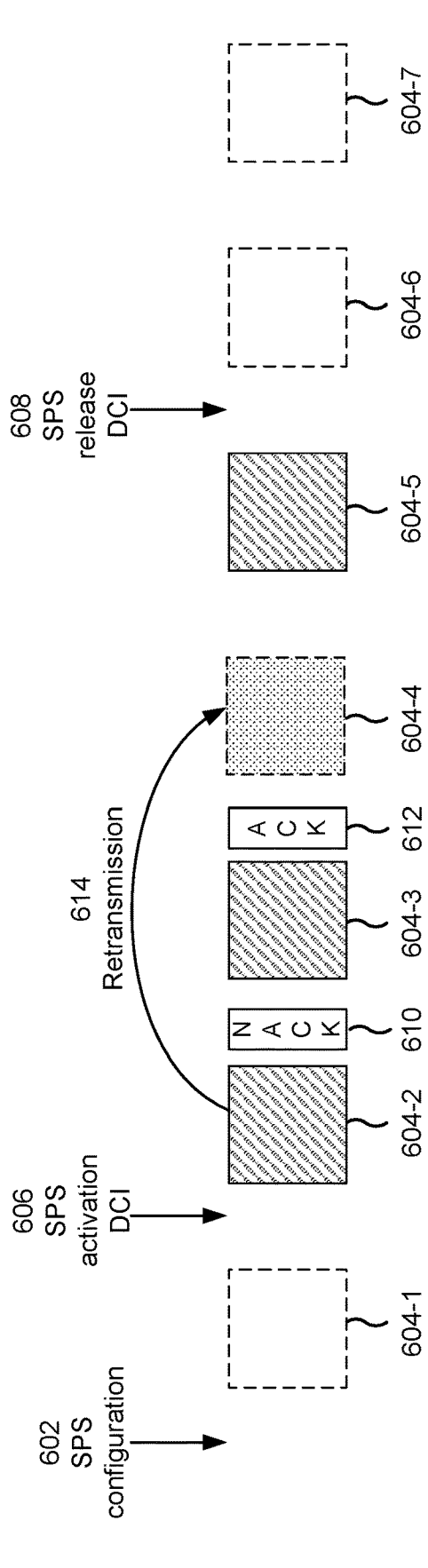
FIG. 6 is a diagram illustrating an example associated with packet retransmission using an unused or skipped semi-persistent scheduling occasion, in accordance with the present disclosure.

FIG. 6 is a diagram illustrating an example 600 associated with packet retransmission using an unused or skipped semi-persistent scheduling occasion, in accordance with the present disclosure. As shown in example 600, and as indicated by reference number 602, a mobile station (e.g., a UE 120) may be configured with an SPS configuration for SPS communications, similar to the SPS configuration for SPS communications described above in connection with FIG. 5. For example, the mobile station may receive the SPS configuration via an RRC message transmitted by a network node 110 (e.g., directly or via one or more network nodes 110).

In a similar manner as described above in connection with FIG. 5, the SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions 604 for the mobile station, indexed in FIG. 6 as SPS occasions 604-1 to 604-7. Moreover, as indicated by reference number 606, the network node 110 may activate the SPS configuration for the mobile station via an SPS activation DCI to the mobile station (e.g., directly or via one or more network nodes 110), which may indicate certain communication parameters (e.g., an MCS, an RB allocation, and/or antenna ports, among other examples) for the SPS PDSCH communications to be transmitted in the scheduled SPS occasions 604. The mobile station may begin monitoring the SPS occasions 604 based at least in part on receiving the SPS activation DCI, in a similar manner as described above in connection with FIG. 5. Moreover, as shown by reference number 608, the mobile station may continue to monitor the SPS occasions 604 until the network node 110 transmits an SPS release DCI to the mobile station (e.g., directly or via one or more network nodes 110) to deactivate the SPS configuration for the mobile station, in a similar manner as described above in connection with FIG. 5.

More particularly, in the aspects depicted in FIG. 6, the mobile station may not monitor (and thus the network node 110 may not transmit data using) a first SPS occasion 604-1 subsequent to the SPS configuration, because the SPS configuration may not have yet been activated by an SPS activation DCI. However, after the network node 110 transmits the SPS activation DCI to the mobile station, the mobile station may monitor, and the network node 110 may transmit downlink traffic using, the subsequent SPS occasions, such as a second SPS occasion 604-2, a third SPS occasion 604-3, a fourth SPS occasion 604-4, and a fifth SPS occasion 604-5. Thereafter, because the network node 110 transmits the SPS release DCI to the mobile station, the mobile station may not monitor (and thus the network node 110 may not transmit data using) the remaining SPS occasions 604, including a sixth SPS occasion 604-6 and a seventh SPS occasion 604-7.

In the monitored SPS occasions 604 (e.g., the SPS occasions occurring after the SPS activation DCI and prior to the SPS release DCI), the network node 110 may transmit downlink traffic to the mobile station or else skip one or more SPS occasions 604 if the network node 110 does not have any data to transmit to the mobile station. For example, as shown using cross-hatching in FIG. 6, the network node 110 may transmit new data in the second SPS occasion 604-2, the third SPS occasion 604-3, and the fifth SPS occasion 604-5. With respect to the fourth SPS occasion 604-4, the network node 110 may not have new data to transmit to the mobile station, and thus, in some aspects, the network node 110 may skip the fourth SPS occasion 604-4. As described above in connection with FIG. 5, in some aspects, the network node 110 may do so by transmitting an SPS cancellation DCI to the mobile station (e.g., directly or via one or more network nodes) to temporarily cancel or deactivate one or more (e.g., N) subsequent SPS occasions 604, such as, in the depicted example, the fourth SPS occasion 604-4.

According to some other aspects, however, the network node 110 may conserve signaling overhead by indicating via an SPS occasion 604 that an SPS occasion 604 is being skipped. For example, rather than transmitting a separate SPS cancellation DCI to indicate that the fourth SPS occasion 604-4 will be skipped, the network node 110 may indicate that the fourth SPS occasion 604-4 will be skipped via an indication provided in a PDSCH communication transmitted in the fourth SPS occasion 604-4. For example, the network node 110 may include DCI in a PDSCH communication transmitted in the fourth SPS occasion 604-4 indicating that the fourth SPS occasion may be skipped. In some aspects, including DCI in a PDSCH communication transmitted in an SPS occasion 604 may be referred to as "piggybacking" DCI on an SPS PDSCH communication.

In some other aspects, DCI included a PDSCH communication transmitted in an SPS occasion 604 (e.g., piggybacked DCI) may indicate other information, such as an indication that a retransmission is provided in the SPS occasion 604. More particularly, as shown in FIG. 6, the mobile station may provide HARQ-ACK feedback or similar feedback information to the network node 110 for one or more SPS occasions 604. For example, as shown by reference number 610, the mobile station may provide HARQ-ACK feedback or similar feedback information associated with the second SPS occasion 604-2, and/or, as shown by reference number 612, the mobile station may provide HARQ-ACK feedback or similar feedback information associated with the third SPS occasion 604-3. In the depicted example, the HARQ-ACK feedback or similar feedback information associated with the second SPS occasion 604-2 indicates that the mobile station did not safely receive and/or decode the data associated with the second SPS occasion 604-2 (e.g., the HARQ-ACK feedback or similar feedback information indicates NACK for the second SPS occasion 604-2), and the HARQ-ACK feedback or similar feedback information associated with the third SPS occasion 604-3 indicates that the mobile station did safely receive and/or decode the data associated with the third SPS occasion 604-2 (e.g., the HARQ-ACK feedback or similar feedback information indicates ACK for the third SPS occasion 604-3).

In such aspects, the network node 110 may use an otherwise unused and/or skipped SPS occasion for retransmitting any data packets that were not safely received and/or decoded. More particularly, in the example shown in FIG. 6, the network node 110 may retransmit packets associated with the second SPS occasion 604-2 in the fourth SPS occasion 604-4, as indicated by reference number 614. This may conserve network resources, because the network node 110 does not need to dynamically allocate and/or signal additional resources (e.g., resources beyond the SPS configured resources) for the retransmission. Moreover, in some aspects, the network node 110 may indicate to the mobile station that data transmitted in the fourth SPS occasion 604-4 is a retransmission of data originally transmitted in the second SPS occasion 604-2 by piggybacking DCI in the PDSCH communication transmitted in the fourth SPS occasion 604-4. More particularly, the network node 110 may indicate, to the mobile station, that the data transmitted in the fourth SPS occasion 604-4 is a retransmission of the NACKed data originally transmitted in the second SPS occasion 604-2 via DCI transmitted in the fourth SPS occasion 604-4, which may conserve signaling overhead because a separated DCI (e.g., a reactivation DCI) need not be transmitted.

In some other aspects, the mobile station may determine that a PDSCH communication is being retransmitted in the fourth SPS occasion 604-4 even absent an explicit retransmission indication (e.g., even absent piggybacked DCI or otherwise). For example, the mobile station may determine that a PDSCH communication is being retransmitted in the fourth SPS occasion 604-4 based at least in part on a skip indication (e.g., an SPS cancellation DCI and/or a skip indication piggybacked on a PDSCH in the fourth SPS occasion 604-4) and/or based at least in part on a retransmission pattern (e.g., upon receiving a skip indication, the mobile station may expect that the skipped SPS occasion will be used to retransmit NACKed packets in the order of PDSCH reception, or the like). Aspects of determining that a PDSCH communication is being retransmitted in an otherwise unused or skipped SPS occasion and/or determining a particular PDSCH communication that is being retransmitted in an otherwise unused or skipped SPS occasion are described in more detail below in connection with FIG. 8.

In the example 600 depicted in FIG. 6, a single SPS configuration is implemented. That is, a PDSCH communication transmitted in an SPS occasion associated with a certain SPS configuration is retransmitted in an otherwise unused or skipped SPS occasion associated with that particular SPS configuration. However, aspects of the disclosure are not so limited. In some other aspects, a NACKed PDSCH communication transmitted in an SPS occasion associated with a first SPS configuration may be retransmitted in an otherwise unused or skipped SPS occasion associated with a second SPS configuration different from the first SPS configuration. Aspects of retransmitting a packet across multiple SPS configurations are described in more detail below in connection with FIGS. 7A and 7B.

As indicated above, FIG. 6 is provided as an example. Other examples may differ from what is described with respect to FIG. 6.

Figure 7A:
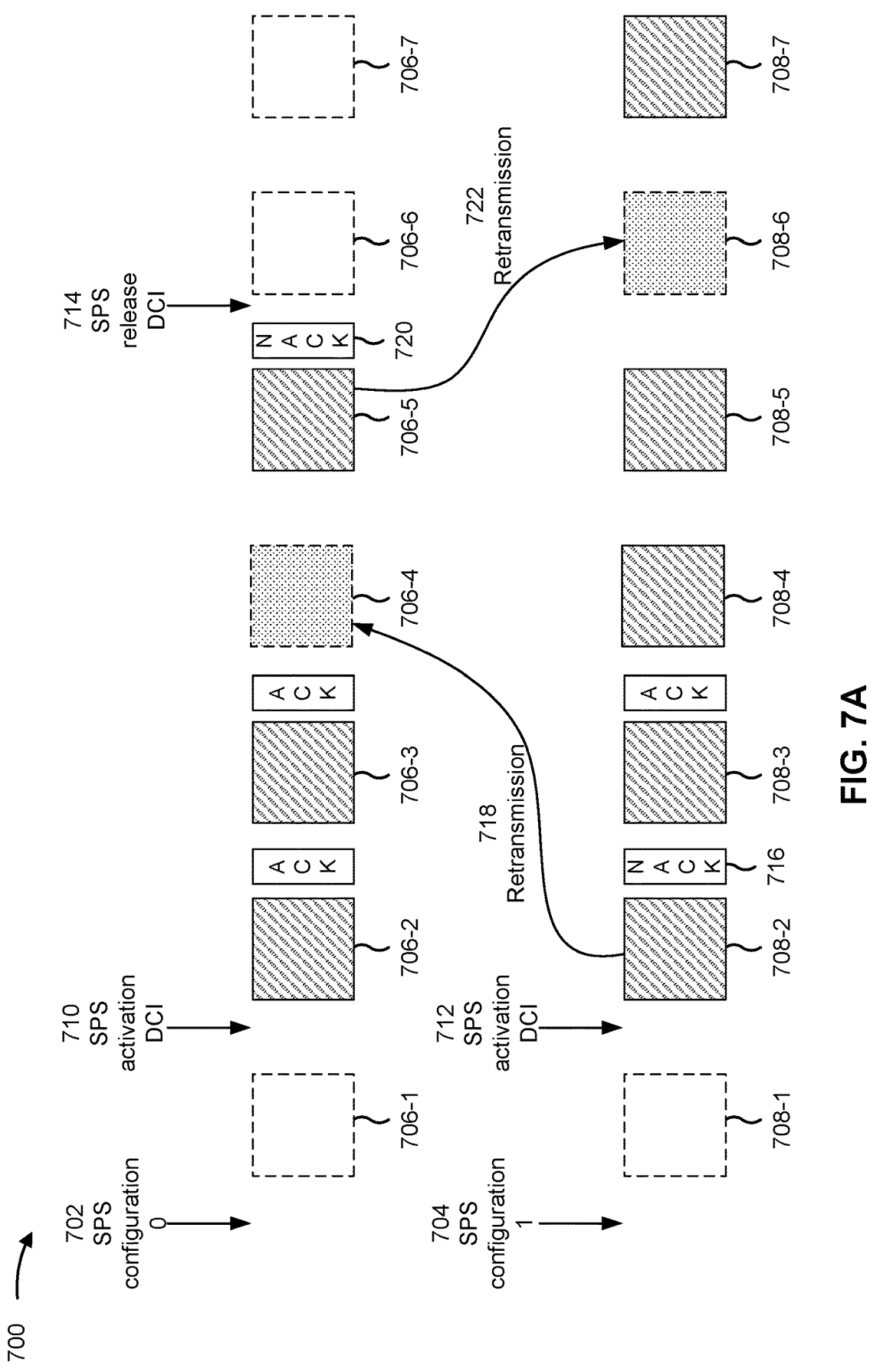
FIGS. 7A-7B are diagrams illustrating another example associated with packet retransmission using an unused or skipped semi-persistent scheduling occasion, in accordance with the present disclosure.
Figure 7B:
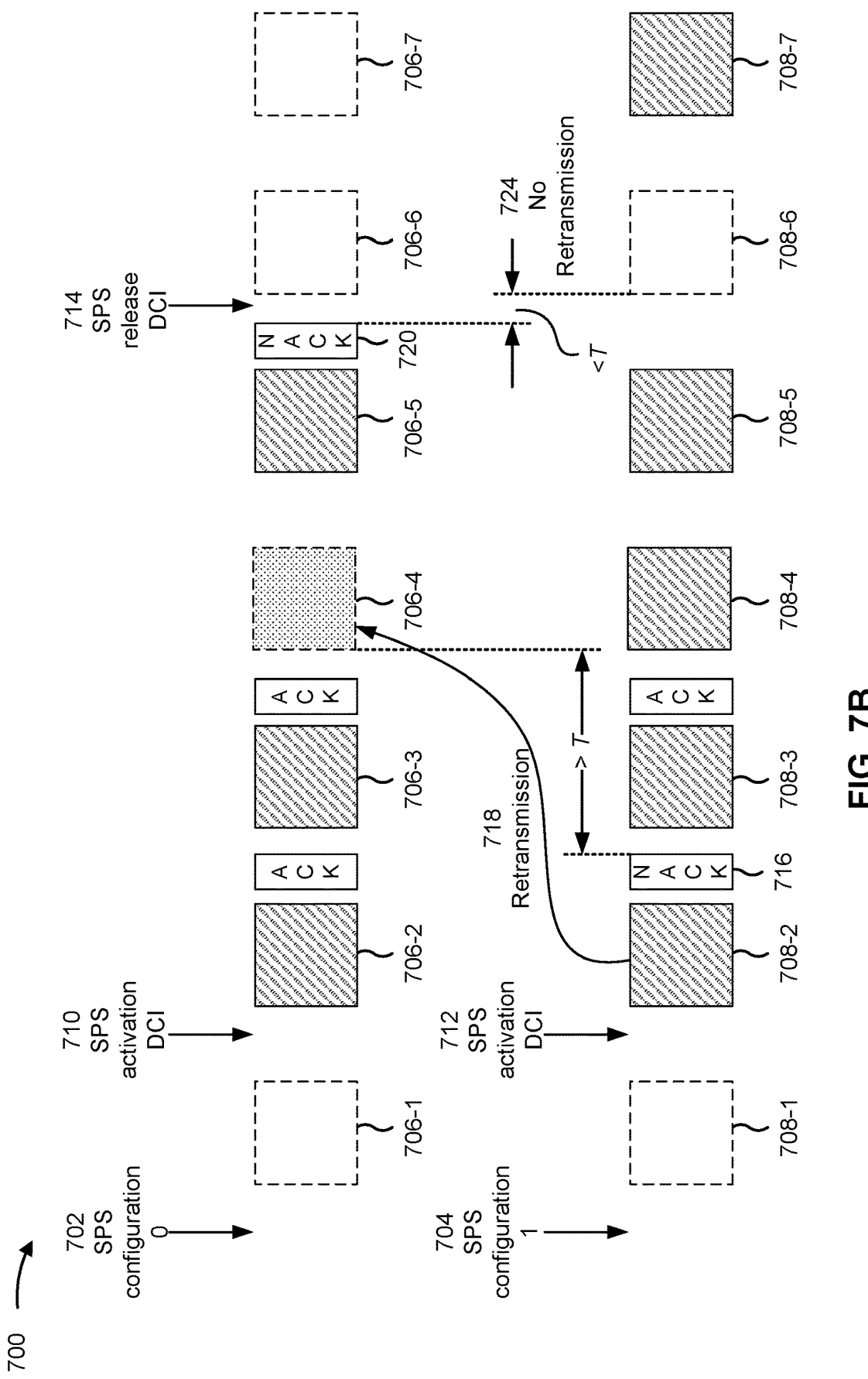

FIGS. 7A-7B are diagrams illustrating another example 700 associated with packet retransmission using an unused or skipped semi-persistent scheduling occasion, in accordance with the present disclosure. As shown in example 700, and as indicated by reference numbers 702 and 704, a mobile station may be configured with multiple SPS configurations for SPS communications, similar to the SPS configuration for SPS communications described above in connection with FIG. 5. For example, the mobile station may receive a first SPS configuration (e.g., the SPS configuration indexed as SPS configuration 0 in FIG. 7A, as indicated by reference number 702) and a second SPS configuration (e.g., the SPS configuration indexed as SPS configuration 1 in FIG. 7A, as indicated by reference number 704) via an RRC message transmitted by a network node 110 (e.g., directly or via one or more network nodes 110).

In a similar manner as described above in connection with FIGS. 5 and 6, the SPS configurations may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions 706, 708 for the mobile station, indexed in FIG. 7A as SPS occasions 706-1 to 706-7 with respect to the first SPS configuration, and as SPS occasions 708-1 to 708-7 with respect to the second SPS configuration. Moreover, as indicated by reference numbers 710 and 712, the network node 110 may activate the SPS configurations for the mobile station via respective SPS activation DCIs to the mobile station (e.g., directly or via one or more network nodes 110), which may indicate certain communication parameters (e.g., an MCS, an RB allocation, and/or antenna ports, among other examples) for the corresponding SPS PDSCH communications to be transmitted in the scheduled SPS occasions 706, 708. The mobile station may begin monitoring the SPS occasions 706, 708 based at least in part on receiving the SPS activation DCIs, in a similar manner as described above in connection with FIGS. 5 and 6.

Moreover, as shown by reference number 714, the mobile station may continue to monitor the SPS occasions 706, 708 until the network node 110 transmits an SPS release DCI to the mobile station (e.g., directly or via one or more network nodes 110) to deactivate the SPS configuration for the mobile station, in a similar manner as described above in connection with FIGS. 5 and 6. More particularly, in this example, based at least in part on receiving the SPS release DCI indicated by reference number 714, the mobile station may cease to monitor the SPS occasions 706 following the SPS release DCI (e.g., the mobile station may cease to monitor the sixth SPS occasion 706-6 and the seventh SPS occasion 706-7). However, because in this example no corresponding SPS release DCI is transmitted for the second SPS configuration, the mobile station may continue to monitor the SPS occasions 708 associated with the second SPS configuration, notwithstanding that the mobile station may cease to monitor certain SPS occasions 706 associated with the first SPS configuration.

In the monitored SPS occasions 706, 708 (e.g., the SPS occasions occurring after the SPS activation DCIs and prior to any SPS release DCI), the network node 110 may transmit downlink traffic to the mobile station or else skip one or more SPS occasions 604 if the network node 110 does not have any data to transmit to the mobile station. For example, as shown using cross-hatching in FIG. 7, the network node 110 may transmit new data in the second SPS occasion 706-2 associated with the first SPS configuration, the third SPS occasion 706-3 associated with the first SPS configuration, the fifth SPS occasion 706-5 associated with the first SPS configuration, the second SPS occasion 708-2 associated with the second SPS configuration, the third SPS occasion 708-3 associated with the second SPS configuration, the fourth SPS occasion 708-4 associated with the second SPS configuration, the fifth SPS occasion 708-5 associated with the second SPS configuration, and the seventh SPS occasion 708-7 associated with the second SPS configuration. With respect to the fourth SPS occasion 706-4 associated with the first SPS configuration and/or the sixth SPS occasion 708-6 associated with the second SPS configuration, the network node 110 may not have new data to transmit to the mobile station, and thus, in some aspects, the network node 110 may skip these SPS occasions. As described above in connection with FIG. 5, in some aspects, the network node 110 may do so by transmitting an SPS cancellation DCI to the mobile station (e.g., directly or via one or more network nodes 110) to temporarily cancel or deactivate one or more (e.g., N) subsequent SPS occasions 706, 708, such as, in the depicted example, the fourth SPS occasion 706-4 associated with the first SPS configuration and/or the sixth SPS occasion 708-6 associated with the second SPS configuration. In some other aspects, the network node 110 may piggyback DCI in a PDSCH communication transmitted in a skipped SPS occasion that includes a skip indication, as described above in connection with FIG. 6 and as is described in more detail below in connection with FIG. 8.

In a similar manner as described above in connection with FIG. 6, the network node 110 may use an otherwise unused and/or skipped SPS occasion for retransmitting any data packets that were not safely received and/or decoded. In this example, the network node 110 may retransmit packets originally transmitted in an SPS occasion associated with one of the first SPS configuration or the second SPS configuration in an otherwise unused and/or skipped SPS occasion associated with the other one of the first SPS configuration or the second SPS configuration. More particularly, in the example shown in FIG. 7A, the network node 110 may retransmit a PDSCH communication associated with the second SPS occasion 708-2 associated with the second SPS configuration (which, as indicated by reference number 716, was a NACKed PDSCH communication) in the fourth SPS occasion 706-4 associated with the first SPS configuration, as indicated by reference number 718. Similarly, the network node may retransmit a PDSCH communication associated with the fifth SPS occasion 706-5 associated with the first SPS configuration (which, as indicated by reference number 720, was a NACKed PDSCH communication) in the sixth SPS occasion 708-6 associated with the second SPS configuration, as indicated by reference number 722. In addition to reducing signaling overhead and conserving network resources (as described above in connection with the retransmission indicated by reference number 614 in FIG. 6), retransmitting NACKed PDSCH communications in otherwise unused and/or skipped SPS occasions across SPS configurations may provide the network node with more flexibility and/or opportunities to retransmit communications, thereby further reducing latency and/or resulting in more efficient usage of network resources.

In some aspects, a mobile station may be configured with a minimum period of time between a NACK communication and an SPS occasion including a retransmission of a PDSCH communication associated with the NACK communication. In some aspects, the minimum period of time may be based at least in part on a decoding capability of the network node 110, such that the mobile station does not expect to receive a retransmitted PDSCH communication prior to the network node 110 having a full opportunity to decode a NACK communication (e.g., the NACK communication indicated by reference number 716 and/or the NACK communication indicated by reference number 720) associated with a NACKed PDSCH communication (e.g., a PDSCH communication originally transmitted in the second SPS occasion 708-2 associated with second SPS configuration and/or the PDSCH communication originally transmitted in the fifth SPS occasion 706-5 associated with the first SPS configuration). For example, as shown in FIG. 7B, the mobile station may be configured with a minimum time period, T, between a NACK communication from the mobile station and an SPS occasion in which the mobile station should expect to receive a retransmission of a PDSCH communication associated with the NACK communication. As shown in this example, the fourth SPS occasion 706-4 associated with the first SPS configuration may occur great than the minimum period of time, T, after the NACK communication indicated by reference number 716. Accordingly, the mobile station may expect to receive a retransmission of the NACKed PDSCH communication associated with the second SPS occasion 708-2 associated with the second SPS configuration in the fourth SPS occasion 706-4 associated with the first SPS configuration, as indicated by reference number 718. However, the sixth SPS occasion 708-6 associated with the second SPS configuration may occur less than the minimum period of time, T, after the NACK communication indicated by reference number 720. Accordingly, the mobile station may not expect to receive a retransmission of the NACKed PDSCH communication associated with the fifth SPS occasion 706-5 associated with the first SPS configuration in the sixth SPS occasion 708-6 associated with the second SPS configuration, as indicated by reference number 724. Aspects of determining that a PDSCH communication is being retransmitted in an otherwise unused or skipped SPS occasion and/or determining a particular PDSCH communication that is being retransmitted in the otherwise unused or skipped SPS occasion across multiple SPS configurations are described in more detail below in connection with FIG. 8.

As indicated above, FIGS. 7A-7B are provided as examples. Other examples may differ from what is described with respect to FIGS. 7A-7B.

Figure 8:
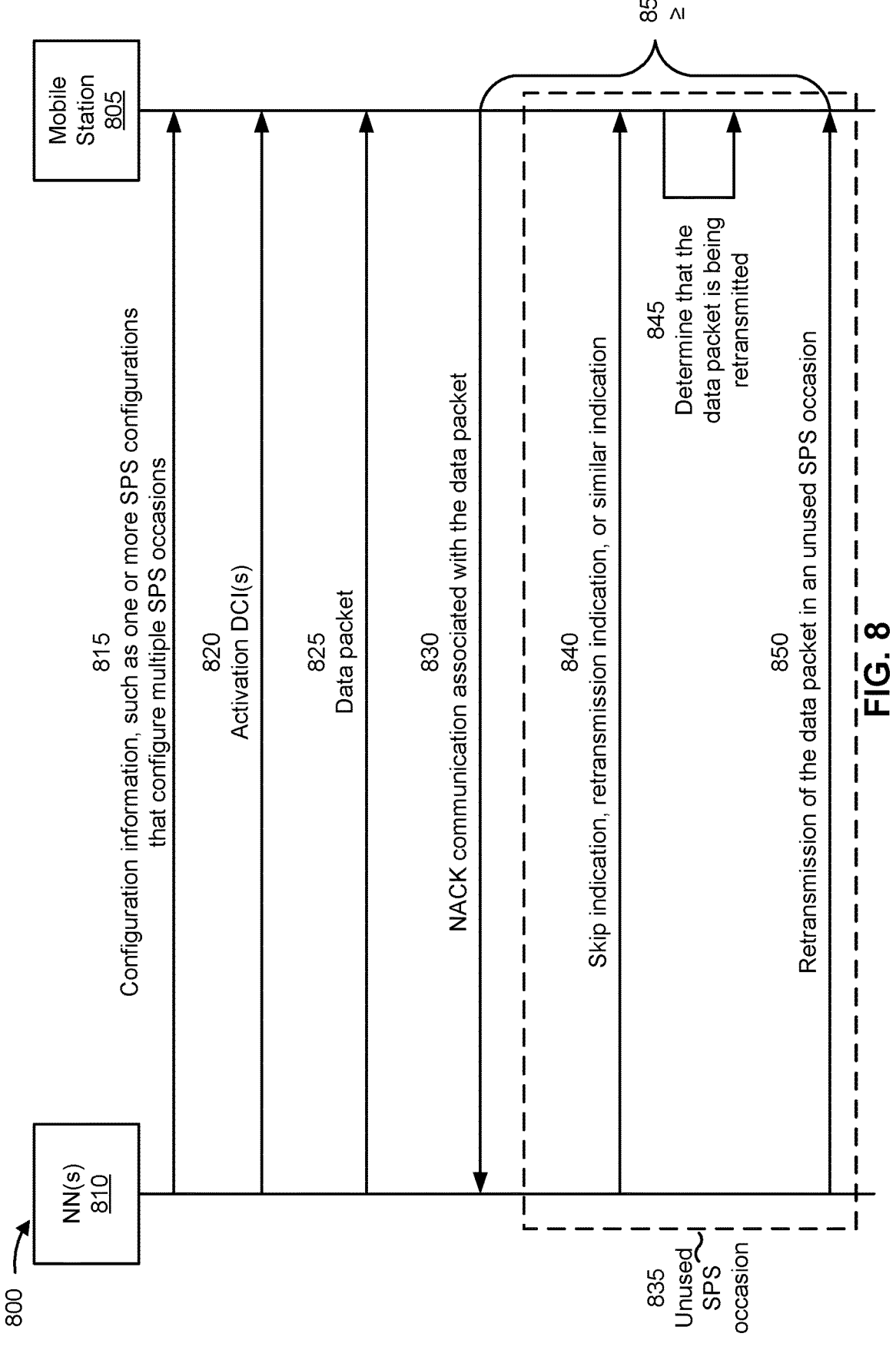
FIG. 8 is a diagram of an example associated with packet retransmission using a semi-persistent scheduling occasion, in accordance with the present disclosure.

FIG. 8 is a diagram of an example 800 associated with packet retransmission using a semi-persistent scheduling occasion, in accordance with the present disclosure. As shown in FIG. 8, a mobile station 805 (e.g., UE 120) may communicate with a network node 810 (e.g., network node 110, a CU, a DU, and/or an RU). In some aspects, the mobile station 805 and the network node 810 may be part of a wireless network (e.g., wireless network 100). The mobile station 805 and the network node 810 may have established a wireless connection prior to operations shown in FIG. 8.

As shown by reference number 815, the network node 810 may transmit, and the mobile station 805 may receive, configuration information. In some aspects, the mobile station 805 may receive the configuration information via one or more of RRC signaling, one or more MAC control elements (MAC-CEs), and/or DCI, among other examples. In some aspects, the configuration information may include an indication of one or more configuration parameters (e.g., already known to the mobile station 805 and/or previously indicated by the network node 810 or other network device) for selection by the mobile station 805, and/or explicit configuration information for the mobile station 805 to use to configure the mobile station 805, among other examples.

In some aspects, the configuration information may configure one or more SPS configurations that configure multiple SPS occasions. For example, the configuration information may configure the single SPS configuration described above in connection with reference number 602, and/or the first SPS configuration described in connection with reference number 702 and the second SPS configuration described in connection with reference number 704.

Additionally, or alternatively, the configuration information may indicate that unused SPS occasions may be used for retransmissions of data packets. In some aspects, the network node 810 may indicate that unused SPS occasions may be used for retransmissions of data packets via an RRC message, and/or the network node 810 may enable and/or disable the use of unused SPS occasions for retransmissions of data packets via an RRC message (e.g., via a retransmission configuration), via a MAC-CE message (e.g., the network node 810 may activate or deactivate the retransmission configuration via a MAC-CE message), and/or via a DCI message (e.g., the network node 810 may dynamically indicate that the retransmission configuration is enabled or disabled via DCI).

As described above in connection with FIGS. 7A and 7B, in some aspects, the configuration information may configure multiple SPS configurations. For example, in some aspects, the one or more SPS configurations transmitted by the network node 810 to the mobile station 805 may include a first SPS configuration and a second SPS configuration different from the first SPS configuration. In such aspects, a data packet that is originally transmitted in an SPS occasion associated with the first SPS configuration may be retransmitted in an unused SPS occasion associated with the second SPS configuration, as described above in connection with FIGS. 7A and 7B and as is described in more detail below in connection with reference number 850. Additionally, or alternatively, in some aspects, the multiple SPS configurations may be associated with different component carriers. For example, the first SPS configuration may be associated with a first component carrier, and the second SPS configuration may be associated with a second component carrier different from the first component carrier.

The mobile station 805 may configure itself based at least in part on the configuration information. In some aspects, the mobile station 805 may be configured to perform one or more operations described herein based at least in part on the configuration information.

As shown by reference number 820, the network node 810 may transmit, and the mobile station 805 may receive, one or more activation DCIs, such as one or more of the activation DCIs described above in connection with reference numbers 606, 710, or 712. For example, when the configuration information configures a single SPS configuration, the mobile station 805 may receive the activation DCI described in connection with reference number 606, activating the multiple SPS occasions 604. And when the configuration information configures multiple (e.g., two) SPS configurations, the mobile station 805 may receive the activation DCI described in connection with reference number 710 associated with the first SPS configuration in FIGS. 7A and 7B, activating the multiple SPS occasions 706, and/or the mobile station 805 may receive the activation DCI described in connection with reference number 712 associated with the second SPS configuration in FIGS. 7A and 7B, activating the multiple SPS occasions 708.

In some aspects, the one or more activation DCIs may include information associated with retransmitting a data packet in an unused SPS occasion associated with the corresponding SPS configuration. For example, the network node 810 may transmit, and the mobile station 805 may receive (e.g., via an activation DCI) a retransmission-pattern indication indicating a retransmission pattern associated with a data packet and one or more other data packets. For example, the retransmission pattern may be associated with a formula or a similar technique used by the mobile station 805 to determine which data packet is being retransmitted in a given SPS occasion. In some aspects, the retransmission pattern indication and/or the retransmission pattern is based at least in part on at least one of a retransmission timer associated with the data packet and the one or more other data packets (e.g., a period of time after which the mobile station should expect retransmission of a NACKed PDSCH communication), a redundancy version (RV) index associated with the data packet and the one or more other data packets, a corresponding HARQ-ACK process identifier associated with each of the data packet and the one or more other data packets, or similar information. In some other aspects, the mobile station 805 may receive the retransmission pattern indication or a similar indication in connection with a different communication received from the network node 110, such as via the configuration information described in connection with reference number 815, an RRC communication, a MAC-CE communication, another DCI communication (e.g., DCI piggybacked on a PDSCH communication transmitted in an SPS occasion), or a similar communication.

Additionally, or alternatively, in some aspects, the one or more activation DCIs may include information associated with grouping SPS configurations for purposes of retransmissions using unused SPS occasions. For example, the one or more activation DCIs may include a grouping indication indicating that the first SPS configuration and the second SPS configuration are grouped for purposes of retransmitting data packets in unused SPS occasions (e.g., indicating that a NACKed PDSCH communication associated with an SPS occasion associated with one of the first SPS configuration or the second SPS configuration may be retransmitted in an unused SPS occasion associated with the other one of the first SPS configuration or the second SPS configuration, as described above in connection with FIGS. 7A and 7B). In some aspects, the grouping indication may be based at least in part on at least one of a corresponding transmission priority associated with each of the first SPS configuration and the second SPS configuration (e.g., the first SPS configuration and the second SPS configuration may be grouped based at least in part on the configurations being associated with a same or similar transmission priority), or a corresponding packet delay requirement associated with each of the first SPS configuration and the second SPS configuration (e.g., the first SPS configuration and the second SPS configuration may be grouped based at least in part on the configurations being associated with a same or similar PDB). In some aspects, one of the activation DCIs may be used to activate and/or deactivate the grouping of the multiple SPS configurations, as necessary. For example, when resource sizes associated with the multiple SPS configurations do not align, the activation DCIs and/or other DCIs or communications may be used to deactivate a previously configured grouping of SPS configurations, as will be described in more detail below in connection with reference number 850. In some other aspects, the mobile station 805 may receive the grouping indication or a similar indication in connection with a different communication received from the network node 110, such as via the configuration information described in connection with reference number 815, an RRC communication, a MAC-CE communication, another DCI communication (e.g., DCI piggybacked on a PDSCH communication transmitted in an SPS occasion), or a similar communication.

As shown by reference number 825, the network node 810 may transmit, and the mobile station 805 may receive, a data packet transmission in an SPS occasion associated with the one or more SPS configurations. For example, the network node 810 may transmit, and the mobile station 805 may receive, a PDSCH communication transmitted in a SPS occasion, such as one of the PDSCH communications described above in connection with SPS occasions 604-2, 604-5, 706-2, 706-3, 706-5, 708-2, 708-3, 708-4, 708-5, or 708-7. In some aspects, the data packet may be associated with an XR communication. More particularly, as described above in connection with FIG. 5, due to the low latency associated with SPS communications, the one or more SPS configurations may be beneficially utilized for purposes of XR communications, because XR communications may be associated with stringent PDBs, or the like. Accordingly, in some aspects, the network node 810 may transmit, and the mobile station 805 may receive, a data packet associated with an XR communication using an SPS occasion.

As shown by reference number 830, the mobile station 805 may transmit, and the network node 810 may receive, a NACK communication associated with the data packet based at least in part on the mobile station 805 failing to receive the data packet and/or failing to correctly decode the data packet. For example, the mobile station 805 may transmit, and the network node 810 may receive, the NACK communication described above in connection with reference number 610 of FIG. 6 and/or one of the NACK communications described above in connection with reference numbers 716 and 720 of FIGS. 7A and 7B.

Based at least in part on receiving the NACK communication from the mobile station 805, the network node 810 may transmit one or more communications to the mobile station 805 using an unused SPS occasion, as shown by reference number 835. The unused SPS occasion may correspond to any of the unused SPS occasions described above in connection with FIGS. 6-7B, such as the fourth SPS occasion 604-4 associated with the SPS configuration described above in connection with FIG. 6, the fourth SPS occasion 706-4 associated with the first SPS configuration described above in connection with FIGS. 7A and 7B, or the sixth SPS occasion 708-6 associated with the second SPS configuration described above in connection with FIGS. 7A and 7B.

More particularly, as shown by reference number 840, in some aspects, the network node 810 may transmit, and the mobile station 805 may receive, a skip indication, a retransmission indication, or a similar indication in the unused SPS occasion. For example, in some aspects, the skip indication, the retransmission indication, or the similar indication may be indicated via DCI piggybacked on a retransmitted PDSCH communication in the unused SPS occasion. In some aspects, the retransmission indication may be an explicit indication indicating that the data packet (e.g., a NACKed PDSCH communication) is being retransmitted in the unused SPS occasion. In such aspects, the retransmission indication may include one or more identifiers or the like indicating which particular data packet (e.g., PDSCH communication) is being retransmitted in the unused SPS occasion. For example, the retransmission indication may indicate at least one of an RV index associated with the data packet being retransmitted, a HARQ identifier associated with the data packet being retransmitted, or the like. Additionally, or alternatively, the retransmission indication may indicate additional information associated with the data packet being retransmitted. For example, the retransmission indication may indicate additional resources associated with the retransmission of the data packet. Additionally, or alternatively, the retransmission indication may indicate one or more other SPS configurations (e.g., one or more SPS indexes associated with the one or more other SPS configurations) associated with the retransmission of the data packet, such as when the configuration information configured multiple SPS configurations and the retransmission in an SPS occasion associated with the one of the first SPS configuration or the second SPS configuration is a retransmission of a data packet originally transmitted in the other one of the first SPS configuration or the second SPS configuration.

In some other aspects, the network node 810 may transmit, and the mobile station 805 may receive, a skip indication indicating that the unused SPS occasion is being skipped (e.g., is not being used to transmit new data). In such aspects, and as shown by reference number 845, the mobile station 805 may determine that a data packet is being retransmitted in the unused SPS occasion based at least in part on the skip indication. For example, in some aspects the mobile station 805 may be associated with a retransmission pattern and/or retransmission formula, such that, when the mobile station 805 is configured to receive retransmissions in unused SPS occasions, the mobile station 805 may expect a retransmission of a NACKed PDSCH communication or the like in unused (e.g., skipped) SPS occasions and/or may know which data packet will be retransmitted in a particular unused SPS occasion. For example, in some aspects, the mobile station may determine that a particular data packet is being retransmitted in the unused SPS occasion based at least in part on at least one of the data packet being an earliest transmitted data packet for which a NACK communication was transmitted and for which retransmission has not yet occurred, or a retransmission pattern associated with the data packet and one or more other data packets.

As shown by reference number 850, the network node 810 may transmit, and the mobile station 805 may receive, a retransmission of the data packet in the unused SPS occasion indicated by reference number 835. For example, the network node 810 may retransmit a NACKed PDSCH communication originally transmitted in one SPS occasion associated with an SPS configuration (e.g., the PDSCH communication associated with the second SPS occasion 604-2 in FIG. 6) in an otherwise unused or skipped SPS occasion associated with the SPS configuration (e.g., the fourth SPS occasion 604-4 in FIG. 6). Moreover, in aspects in which multiple SPS configurations have been configured (e.g., the first SPS configuration and the second SPS configuration described above in connection with FIGS. 7A and 7B), the network node 810 may originally transmit a data packet in an SPS occasion associated with one of the SPS configurations (e.g., the second SPS occasion 708-2 associated with second SPS configuration in FIG. 7A or the fifth SPS occasion 706-5 associated with first SPS configuration in FIG. 7A), and the network node 810 may retransmit the data packet in an unused SPS occasion associated with a different one of the SPS configurations (e.g., the fourth SPS occasion 706-4 associated with first SPS configuration in FIG. 7A or the sixth SPS occasion 708-6 associated with second SPS configuration in FIG. 7A).

In aspects in which multiple SPS configurations are configured for the mobile station 805, a size of resources (e.g., a number of resource blocks, a number of symbols, or the like) associated with each SPS occasion may differ between the various SPS configurations. Thus, in some aspects, the network node 810 may downselect from multiple SPS configurations to be used for retransmission purposes such that SPS configurations used for retransmission purposes are associated with the same or similar sized SPS occasions (e.g., such that a retransmission of a data packet occurs in an SPS occasion with enough resources to cover the data packet).

In some other aspects, the network node 810 may alter the data to be retransmitted based at least in part a number of resources available in the unused SPS occasion, or the like. More particularly, in aspects in which an SPS occasion associated with the original transmission of the data packet is smaller than the unused SPS occasion (e.g., the SPS occasion to be used for the retransmission of the data packet), a coding gain associated with the retransmission of the data packet may be greater than a coding gain associated with the original transmission of the data packet in order to increase the size of the retransmitted packet. And in aspects in which an SPS occasion associated with the original transmission of the data packet is larger than the unused SPS occasion (e.g., the SPS occasion to be used for the retransmission of the data packet), retransmission of the data packet in the unused SPS occasion may be based at least in part on puncturing the data packet (e.g., the network node 810 may puncture some resource elements and/or resource blocks associated with the retransmission of the data packet) in order to decrease the size of the retransmitted packet.

In some other aspects, the retransmitted data packet itself may indicate that the data packet is a retransmission of a NACKed PDSCH communication, or the like. For example, in order to avoid sending the retransmission indication, the skip indication, or a similar indication in the unused SPS occasion, as described above in connection with reference number 840, in some aspects, a scrambling sequence (sometimes referred to as SkippedSPSOccasionRnti) and/or scrambler may be used to scramble a cyclic redundancy check (CRC) associated with the retransmitted packet, thereby indicating that the data packet is a retransmission of a previously NACKed packet. Put another way, in some aspects, the network node 810 may scramble the CRC of the data packet with a scrambling sequence indicating that the data packet is a retransmission of a previously transmitted data packet. In some aspects, the scrambling sequence may indicate at least one of a HARQ-ACK process identifier associated with the previously transmitted data packet, an SPS index associated with an SPS configuration, of the one or more SPS configurations, associated with the previously transmitted data packet, or similar information. In such aspects, the mobile station 805 may monitor HARQ-ACK process identifiers or similar information and thus determine that a given PDSCH communication is a retransmission of a NACKed PDSCH communication. More particularly, for a given unused SPS occasion, the mobile station 805 may attempt to decode a data packet using a regular process, and, if decoding fails, the mobile station 805 may attempt to decode a second CRC based at least in part on a log-likelihood ratio (LLR) process, a decoding signature, or the like. If the second decoding process is successful, the mobile station 805 may determine that the data packet was a retransmission of a previously NACKed packet. In some aspects, if the mobile station 805 is unable to decode the retransmitted packet (and thus the scrambled CRC thereof), the mobile station 805 may transmit, to the network node 110, a NACK communication so that the network node 110.

In some aspects, the retransmission of the data packet is self-decodable. Put another way, the network node 110 may utilize an unused SPS occasion associated with RV 0 or RV 3 (e.g., a self-decodable transmission) for purposes of transmitting a standalone data packet, such as for purposes of achieving diversity gains. In some other aspects, the retransmission of the data packet may be combinable with an original transmission of the data packet using an LLR combination process or similar process, such as for purposes of enhancing decoding of a data packet. In such aspects, the network node 810 may transmit, and the mobile station 805 may receive, a combining indication indicating certain information associated with combining the retransmitted data packet and the originally transmitted data packet. For example, the combining indication may indicate at least one of an RV associated with the data packet or a HARQ-ACK process identifier associated with the data packet. For example, in aspects in which the RV of the retransmission has been changed, the network node 810 may nonetheless indicate to the mobile station 805 that the original data packet and the retransmitted data should be combined, and/or the network node 810 may piggyback information used to combine the transmissions (e.g., the retransmission RV and/or HARQ-ACK process identifier) in another communication, such as in a MAC-CE communication, a non-scheduling DCI communication, or a similar communication.

As described above in connection with FIG. 7B, in some aspects, a data packet may only be transmitted in an unused SPS occasion occurring at least a minimum period of time (e.g., T) after the mobile station 805 has transmitted a corresponding NACK communication, such as to give the network node 810 sufficient time to decode the NACK communication. Accordingly, as shown by reference number 855, in some aspects, the retransmission of the data packet in the unused occasion may occur greater than or equal to the minimum period of time, T, after the NACK communication associated with the data packet. Moreover, in some aspects, the network node 810 may transmit, and the mobile station 805 may receive, a timer indication indicating the minimum period of time (e.g., T) that must elapse between a transmission of a NACK communication associated with the data packet and the retransmission of the data packet. In such aspects, the mobile station 805 may determine that only data packets for which a corresponding NACK communication was transmitted at least the minimum period of time, T, prior to the unused SPS occasion should be expected in the unused SPS occasion.

Based at least in part on the network node 810 transmitting, and the mobile station 805 receiving, a retransmission of a data packet in an otherwise unused or skipped SPS occasion, the mobile station 805 and/or the network node 810 may conserve computing, power, network, and/or communication resources that may have otherwise been consumed by dynamically retransmitting data packets, such as PDSCH communications or similar communications. For example, based at least in part on the network node 810 transmitting, and the mobile station 805 receiving, a retransmission of a data packet in an otherwise unused or skipped SPS occasion, the mobile station 805 and the network node 810 may communicate using reduced signaling overhead and network resource consumption, resulting in reduced latency an increased throughout suitable for XR communications or similar communications associated with stringent PDBs and/or high data rates.

As indicated above, FIG. 8 is provided as an example. Other examples may differ from what is described with respect to FIG. 8.

Figure 9:
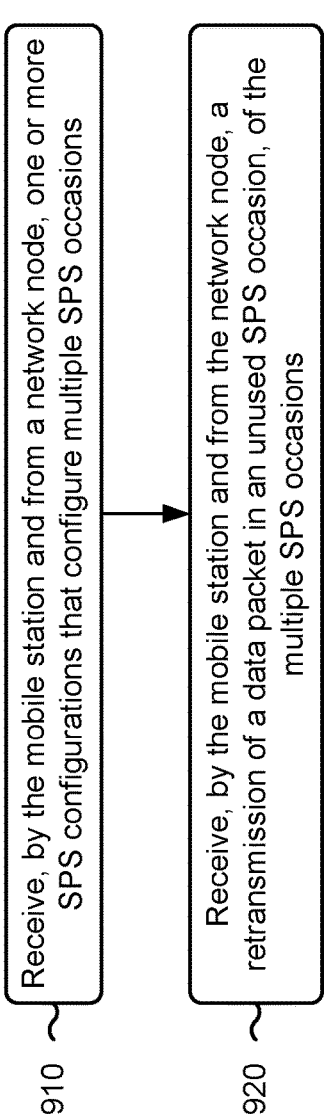
FIG. 9 is a diagram illustrating an example process performed, for example, by a mobile station, in accordance with the present disclosure.

FIG. 9 is a diagram illustrating an example process 900 performed, for example, by a mobile station, in accordance with the present disclosure. Example process 900 is an example where the mobile station (e.g., mobile station 805) performs operations associated with packet retransmission using a semi-persistent scheduling occasion.

As shown in FIG. 9, in some aspects, process 900 may include receiving, from a network node, one or more SPS configurations that configure multiple SPS occasions (block 910). For example, the mobile station (e.g., using communication manager 140 and/or reception component 1102, depicted in FIG. 11) may receive, from a network node, one or more SPS configurations that configure multiple SPS occasions, as described above.

As further shown in FIG. 9, in some aspects, process 900 may include receiving, from the network node, a retransmission of a data packet in an unused SPS occasion, of the multiple SPS occasions (block 920). For example, the mobile station (e.g., using communication manager 140 and/or reception component 1102, depicted in FIG. 11) may receive, from the network node, a retransmission of a data packet in an unused SPS occasion, of the multiple SPS occasions, as described above.

Process 900 may include additional aspects, such as any single aspect or any combination of aspects described below and/or in connection with one or more other processes described elsewhere herein.

In a first aspect, the data packet is associated with an extended reality communication.

In a second aspect, alone or in combination with the first aspect, process 900 includes receiving, by the mobile station and from the network node, a retransmission indication indicating that the data packet is being retransmitted in the unused SPS occasion, wherein the retransmission indication is received in the unused SPS occasion.

In a third aspect, alone or in combination with one or more of the first and second aspects, the retransmission indication indicates at least one of a redundancy version index associated with the data packet, a hybrid automatic repeat request identifier associated with the data packet, additional resources associated with the retransmission of the data packet, or one or more other SPS configurations associated with the retransmission of the data packet.

In a fourth aspect, alone or in combination with one or more of the first through third aspects, the one or more SPS configurations indicate that unused SPS occasions may be used for retransmissions of data packets.

In a fifth aspect, alone or in combination with one or more of the first through fourth aspects, process 900 includes receiving, by the mobile station and from the network node, a skip indication indicating that the unused SPS occasion is being skipped, and determining, by the mobile station, that the data packet is being retransmitted in the unused SPS occasion based at least in part on the skip indication.

In a sixth aspect, alone or in combination with one or more of the first through fifth aspects, determining that the data packet is being retransmitted in the unused SPS occasion is further based at least in part on at least one of the data packet being an earliest transmitted data packet for which a negative acknowledgment message was transmitted and for which retransmission has not yet occurred, or a retransmission pattern associated with the data packet and one or more other data packets.

In a seventh aspect, alone or in combination with one or more of the first through sixth aspects, process 900 includes receiving, by the mobile station and from the network node, a retransmission-pattern indication indicating the retransmission pattern associated with the data packet and one or more other data packets.

In an eighth aspect, alone or in combination with one or more of the first through seventh aspects, the retransmission pattern is based at least in part on at least one of a retransmission timer associated with the data packet and the one or more other data packets, a redundancy version index associated with the data packet and the one or more other data packets, or a corresponding hybrid automatic repeat request acknowledgement process identifier associated with each of the data packet and the one or more other data packets.

In a ninth aspect, alone or in combination with one or more of the first through eighth aspects, the one or more SPS configurations include a first SPS configuration and a second SPS configuration different from the first SPS configuration, the data packet is originally transmitted in an SPS occasion associated with the first SPS configuration, and the unused SPS occasion is associated with the second SPS configuration.

In a tenth aspect, alone or in combination with one or more of the first through ninth aspects, process 900 includes receiving, by the mobile station and from the network node, a grouping indication indicating that the first SPS configuration and the second SPS configuration are grouped for purposes of retransmitting data packets in unused SPS occasions.

In an eleventh aspect, alone or in combination with one or more of the first through tenth aspects, the grouping indication is based at least in part on at least one of a corresponding transmission priority associated with each of the first SPS configuration and the second SPS configuration, or a corresponding packet delay requirement associated with each of the first SPS configuration and the second SPS configuration.

In a twelfth aspect, alone or in combination with one or more of the first through eleventh aspects, the SPS occasion associated with the first SPS configuration is smaller than the unused SPS occasion, and a coding gain associated with the retransmission of the data packet is greater than a coding gain associated with an original transmission of the data packet.

In a thirteenth aspect, alone or in combination with one or more of the first through twelfth aspects, the SPS occasion associated with the first SPS configuration is larger than the unused SPS occasion, and the retransmission of the data packet in the unused SPS occasion is based at least in part on puncturing the data packet.

In a fourteenth aspect, alone or in combination with one or more of the first through thirteenth aspects, the first SPS configuration is associated with a first component carrier, and the second SPS configuration is associated with a second component carrier different from the first component carrier.

In a fifteenth aspect, alone or in combination with one or more of the first through fourteenth aspects, process 900 includes receiving, by the mobile station and from the network node, a timer indication indicating a minimum period of time that must elapse between a transmission of a negative acknowledgement communication associated with the data packet and the retransmission of the data packet.

In a sixteenth aspect, alone or in combination with one or more of the first through fifteenth aspects, a cyclic redundancy check of the data packet is scrambled with a scrambling sequence indicating that the data packet is a retransmission of a previously transmitted data packet.

In a seventeenth aspect, alone or in combination with one or more of the first through sixteenth aspects, the scrambling sequence indicates at least one of a hybrid automatic repeat request acknowledgement process identifier associated with the previously transmitted data packet, or an SPS index associated with an SPS configuration, of the one or more SPS configurations, associated with the previously transmitted data packet.

In an eighteenth aspect, alone or in combination with one or more of the first through seventeenth aspects, the retransmission of the data packet is self-decodable.

In a nineteenth aspect, alone or in combination with one or more of the first through eighteenth aspects, the retransmission of the data packet is combinable with an original transmission of the data packet using a log likelihood ratio combination process.

In a twentieth aspect, alone or in combination with one or more of the first through nineteenth aspects, process 900 includes receiving, by the mobile station and from the network node, a combining indication indicating at least one of a redundancy version associated with the data packet, or a hybrid automatic repeat request acknowledgement process identifier associated with the data packet.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
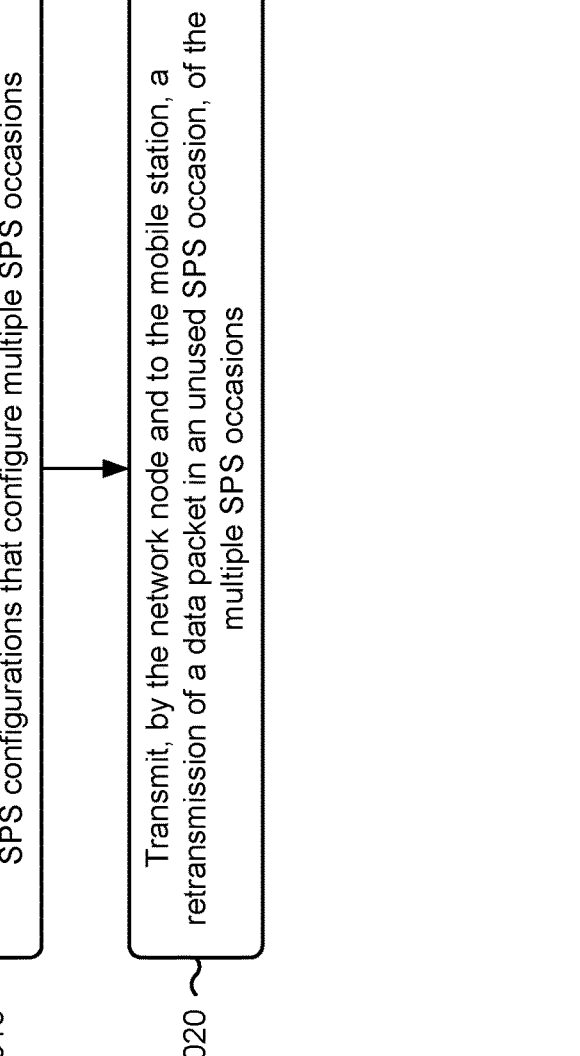
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 810) performs operations associated with packet retransmission using a semi-persistent scheduling occasion.

As shown in FIG. 10, in some aspects, process 1000 may include transmitting, to a mobile station, one or more SPS configurations that configure multiple SPS occasions (block 1010). For example, the network node (e.g., using communication manager 150, transmission component 1204, and/or configuration component 1208 depicted in FIG. 12) may transmit, to a mobile station, one or more SPS configurations that configure multiple SPS occasions, as described above.

As further shown in FIG. 10, in some aspects, process 1000 may include transmitting, to the mobile station, a retransmission of a data packet in an unused SPS occasion, of the multiple SPS occasions (block 1020). For example, the network node (e.g., using communication manager 150 and/or transmission component 1204, depicted in FIG. 12) may transmit, to the mobile station, a retransmission of a data packet in an unused SPS occasion, of the multiple SPS occasions, as described above.

Process 1000 may include additional aspects, such as any single aspect or any combination of aspects described below and/or in connection with one or more other processes described elsewhere herein.

In a first aspect, the data packet is associated with an extended reality communication.

In a second aspect, alone or in combination with the first aspect, process 1000 includes transmitting, by the network node and to the mobile station, a retransmission indication indicating that the data packet is being retransmitted in the unused SPS occasion, wherein the retransmission indication is transmitted in the unused SPS occasion.

In a third aspect, alone or in combination with one or more of the first and second aspects, the retransmission indication indicates at least one of a redundancy version index associated with the data packet, a hybrid automatic repeat request identifier associated with the data packet, additional resources associated with the retransmission of the data packet, or one or more other SPS configurations associated with the retransmission of the data packet.

In a fourth aspect, alone or in combination with one or more of the first through third aspects, the one or more SPS configurations indicate that unused SPS occasions may be used for retransmissions of data packets.

In a fifth aspect, alone or in combination with one or more of the first through fourth aspects, process 1000 includes transmitting, by the network node and to the mobile station, a skip indication indicating that the unused SPS occasion is being skipped.

In a sixth aspect, alone or in combination with one or more of the first through fifth aspects, process 1000 includes transmitting, by the network node and to the mobile station, a retransmission-pattern indication indicating a retransmission pattern associated with the data packet and one or more other data packets.

In a seventh aspect, alone or in combination with one or more of the first through sixth aspects, the retransmission pattern is based at least in part on at least one of a retransmission timer associated with the data packet and the one or more other data packets, a redundancy version index associated with the data packet and the one or more other data packets, or a corresponding hybrid automatic repeat request acknowledgement process identifier associated with each of the data packet and the one or more other data packets.

In an eighth aspect, alone or in combination with one or more of the first through seventh aspects, the one or more SPS configurations include a first SPS configuration and a second SPS configuration different from the first SPS configuration, the data packet is originally transmitted in an SPS occasion associated with the first SPS configuration, and the unused SPS occasion is associated with the second SPS configuration.

In a ninth aspect, alone or in combination with one or more of the first through eighth aspects, process 1000 includes transmitting, by the network node and to the mobile station, a grouping indication indicating that the first SPS configuration and the second SPS configuration are grouped for purposes of retransmitting data packets in unused SPS occasions.

In a tenth aspect, alone or in combination with one or more of the first through ninth aspects, the grouping indication is based at least in part on at least one of a corresponding transmission priority associated with each of the first SPS configuration and the second SPS configuration, or a corresponding packet delay requirement associated with each of the first SPS configuration and the second SPS configuration.

In an eleventh aspect, alone or in combination with one or more of the first through tenth aspects, the SPS occasion associated with the first SPS configuration is smaller than the unused SPS occasion, and a coding gain associated with the retransmission of the data packet is greater than a coding gain associated with an original transmission of the data packet.

In a twelfth aspect, alone or in combination with one or more of the first through eleventh aspects, the SPS occasion associated with the first SPS configuration is larger than the unused SPS occasion, and the retransmission of the data packet in the unused SPS occasion is based at least in part on puncturing the data packet.

In a thirteenth aspect, alone or in combination with one or more of the first through twelfth aspects, the first SPS configuration is associated with a first component carrier, and the second SPS configuration is associated with a second component carrier different from the first component carrier.

In a fourteenth aspect, alone or in combination with one or more of the first through thirteenth aspects, process 1000 includes transmitting, by the network node and to the mobile station, a timer indication indicating a minimum period of time that must elapse between a transmission of a negative acknowledgement communication associated with the data packet and the retransmission of the data packet.

In a fifteenth aspect, alone or in combination with one or more of the first through fourteenth aspects, a cyclic redundancy check of the data packet is scrambled with a scrambling sequence indicating that the data packet is a retransmission of a previously transmitted data packet.

In a sixteenth aspect, alone or in combination with one or more of the first through fifteenth aspects, the scrambling sequence indicates at least one of a hybrid automatic repeat request acknowledgement process identifier associated with the previously transmitted data packet, or an SPS index associated with an SPS configuration, of the one or more SPS configurations, associated with the previously transmitted data packet.

In a seventeenth aspect, alone or in combination with one or more of the first through sixteenth aspects, the retransmission of the data packet is self-decodable.

In an eighteenth aspect, alone or in combination with one or more of the first through seventeenth aspects, the retransmission of the data packet is combinable with an original transmission of the data packet using a log likelihood ratio combination process.

In a nineteenth aspect, alone or in combination with one or more of the first through eighteenth aspects, process 1000 includes transmitting, by the network node and to the mobile station, a combining indication indicating at least one of a redundancy version associated with the data packet, or a hybrid automatic repeat request acknowledgement process identifier associated with the data packet.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
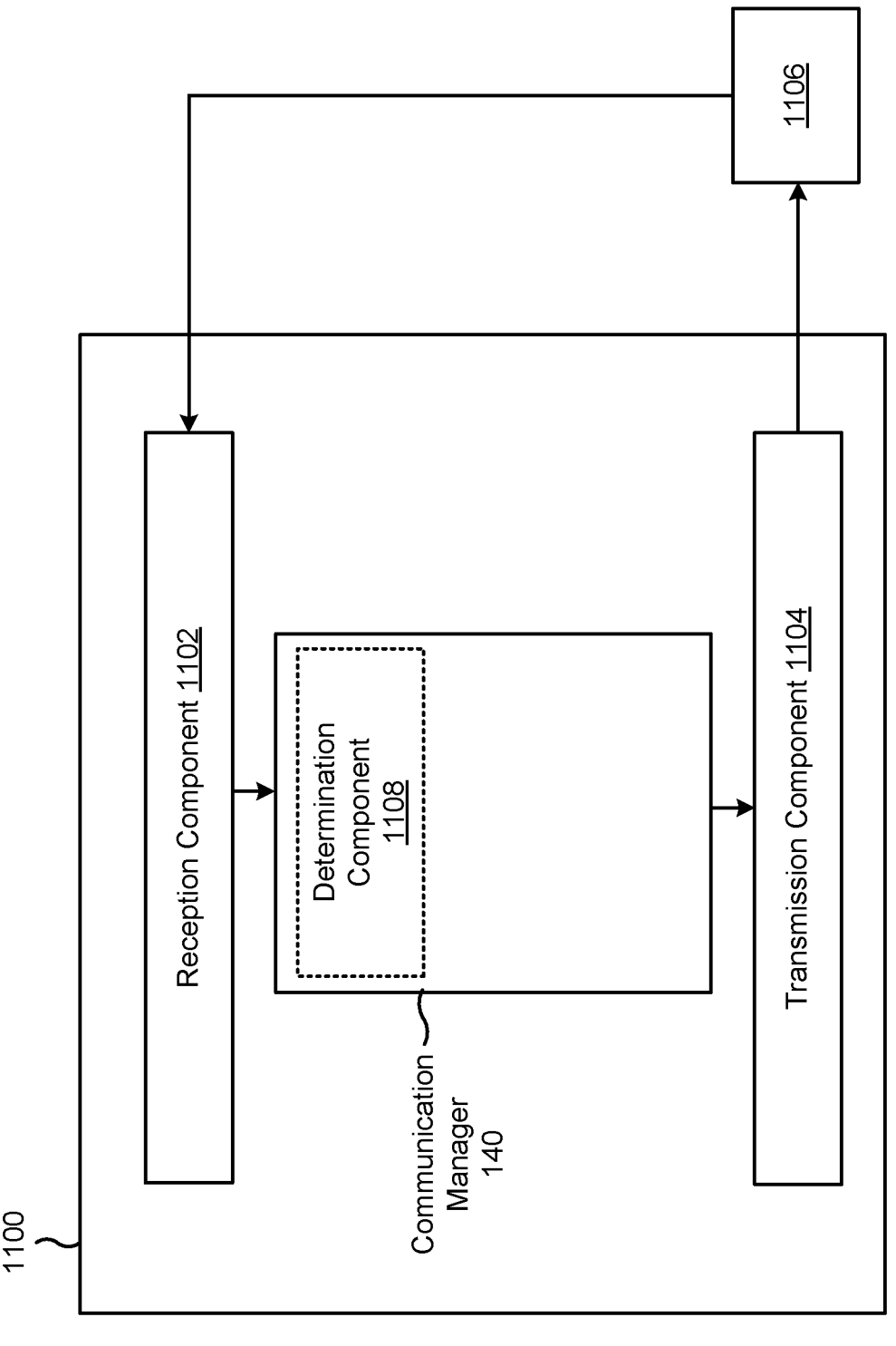
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a mobile station (e.g., mobile station 805), or a mobile station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE 120, a network node 110, or another wireless communication device) using the reception component 1102 and the transmission component 1104. As further shown, the apparatus 1100 may include the communication manager 140. The communication manager 140 may include a determination component 1108, among other examples.

In some aspects, the apparatus 1100 may be configured to perform one or more operations described herein in connection with FIGS. 6-8. Additionally, or alternatively, the apparatus 1100 may be configured to perform one or more processes described herein, such as process 900 of FIG. 9, process 1000 of FIG. 10, or a combination thereof. In some aspects, the apparatus 1100 and/or one or more components shown in FIG. 11 may include one or more components of UE 120 described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE 120 described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE 120 described in connection with FIG. 2. In some aspects, the transmission component 1104 may be co-located with the reception component 1102 in a transceiver.

The reception component 1102 may receive, from a network node, one or more SPS configurations that configure multiple SPS occasions. The reception component 1102 may receive, from the network node, a retransmission of a data packet in an unused SPS occasion, of the multiple SPS occasions.

The reception component 1102 may receive, from the network node, a retransmission indication indicating that the data packet is being retransmitted in the unused SPS occasion, wherein the retransmission indication is received in the unused SPS occasion.

The reception component 1102 may receive, from the network node, a skip indication indicating that the unused SPS occasion is being skipped.

The determination component 1108 may determine that the data packet is being retransmitted in the unused SPS occasion based at least in part on the skip indication.

The reception component 1102 may receive, from the network node, a retransmission-pattern indication indicating the retransmission pattern associated with the data packet and one or more other data packets.

The reception component 1102 may receive, from the network node, a grouping indication indicating that the first SPS configuration and the second SPS configuration are grouped for purposes of retransmitting data packets in unused SPS occasions.

The reception component 1102 may receive, from the network node, a timer indication indicating a minimum period of time that must elapse between a transmission of a negative acknowledgement communication associated with the data packet and the retransmission of the data packet.

The reception component 1102 may receive, from the network node, a combining indication indicating at least one of a redundancy version associated with the data packet, or a hybrid automatic repeat request acknowledgement process identifier associated with the data packet.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
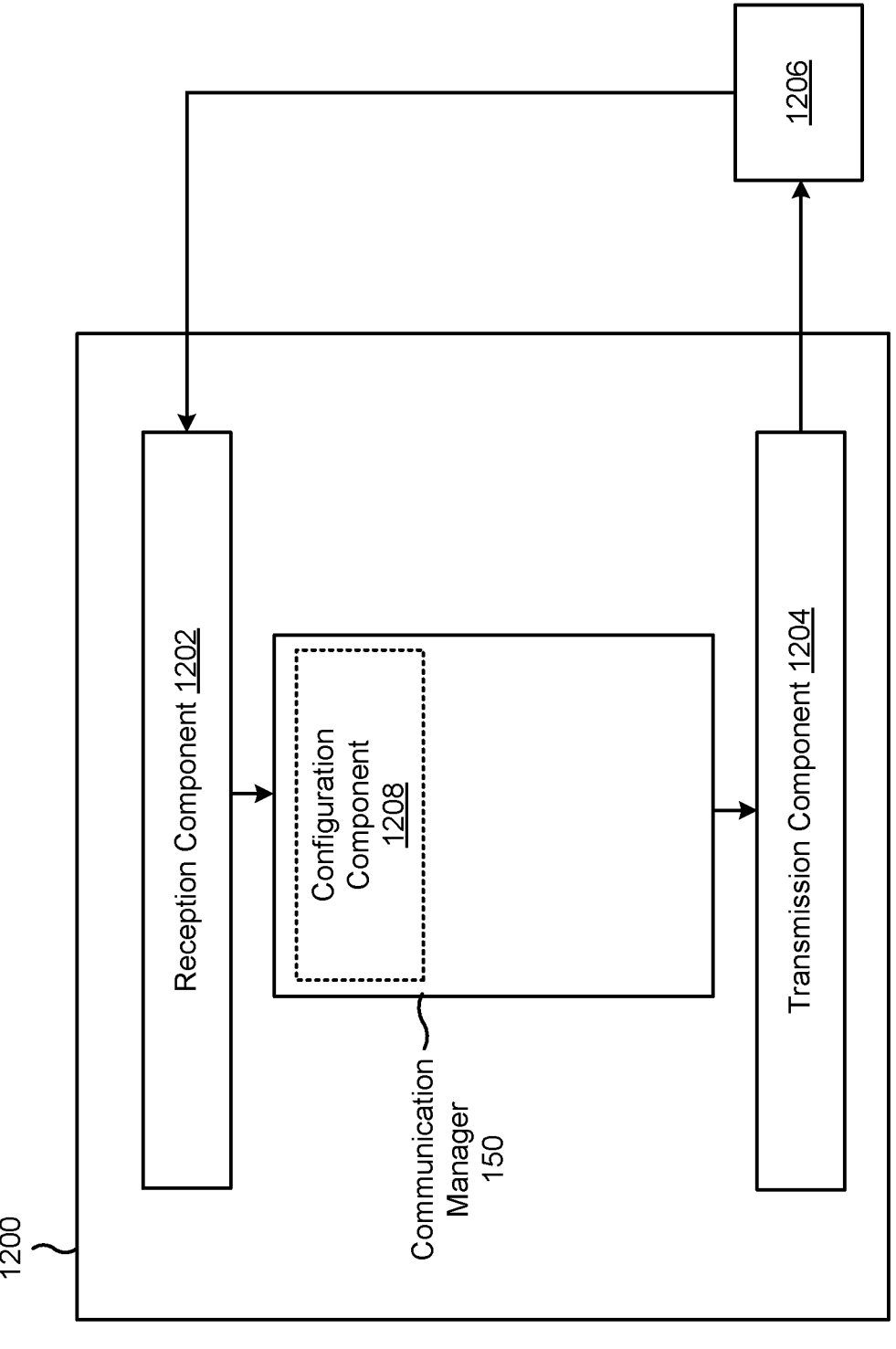
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node (e.g., network node 810), or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE 120, a network node 110, or another wireless communication device) using the reception component 1202 and the transmission component 1204. As further shown, the apparatus 1200 may include the communication manager 150. The communication manager 150 may include a configuration component 1208, among other examples.

In some aspects, the apparatus 1200 may be configured to perform one or more operations described herein in connection with FIGS. 6-8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node 110 described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node 110 described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node 110 described in connection with FIG. 2. In some aspects, the transmission component 1204 may be co-located with the reception component 1202 in a transceiver.

The transmission component 1204 and/or the configuration component 1208 may transmit, to a mobile station, one or more SPS configurations that configure multiple SPS occasions. The transmission component 1204 may transmit, to the mobile station, a retransmission of a data packet in an unused SPS occasion, of the multiple SPS occasions.

The transmission component 1204 may transmit, to the mobile station, a retransmission indication indicating that the data packet is being retransmitted in the unused SPS occasion, wherein the retransmission indication is transmitted in the unused SPS occasion.

The transmission component 1204 may transmit, to the mobile station, a skip indication indicating that the unused SPS occasion is being skipped.

The transmission component 1204 may transmit, to the mobile station, a retransmission-pattern indication indicating a retransmission pattern associated with the data packet and one or more other data packets.

The transmission component 1204 may transmit, to the mobile station, a grouping indication indicating that the first SPS configuration and the second SPS configuration are grouped for purposes of retransmitting data packets in unused SPS occasions.

The transmission component 1204 may transmit, to the mobile station, a timer indication indicating a minimum period of time that must elapse between a transmission of a negative acknowledgement communication associated with the data packet and the retransmission of the data packet.

The transmission component 1204 may transmit, to the mobile station, a combining indication indicating at least one of a redundancy version associated with the data packet, or a hybrid automatic repeat request acknowledgement process identifier associated with the data packet.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a mobile station, comprising: receiving, by the mobile station and from a network node, one or more SPS configurations that configure multiple SPS occasions; and receiving, by the mobile station and from the network node, a retransmission of a data packet in an unused SPS occasion, of the multiple SPS occasions.

Aspect 2: The method of Aspect 1, wherein the data packet is associated with an extended reality communication.

Aspect 3: The method of any of Aspects 1-2, further comprising receiving, by the mobile station and from the network node, a retransmission indication indicating that the data packet is being retransmitted in the unused SPS occasion, wherein the retransmission indication is received in the unused SPS occasion.

Aspect 4: The method of Aspect 3, wherein the retransmission indication indicates at least one of: a redundancy version index associated with the data packet, a hybrid automatic repeat request identifier associated with the data packet, additional resources associated with the retransmission of the data packet, or one or more other SPS configurations associated with the retransmission of the data packet.

Aspect 5: The method of any of Aspects 1-4, wherein the one or more SPS configurations indicate that unused SPS occasions may be used for retransmissions of data packets.

Aspect 6: The method of any of Aspects 1-5, further comprising: receiving, by the mobile station and from the network node, a skip indication indicating that the unused SPS occasion is being skipped; and determining, by the mobile station, that the data packet is being retransmitted in the unused SPS occasion based at least in part on the skip indication.

Aspect 7: The method of Aspect 6, wherein determining that the data packet is being retransmitted in the unused SPS occasion is further based at least in part on at least one of: the data packet being an earliest transmitted data packet for which a negative acknowledgment message was transmitted and for which retransmission has not yet occurred, or a retransmission pattern associated with the data packet and one or more other data packets.

Aspect 8: The method of Aspect 7, further comprising receiving, by the mobile station and from the network node, a retransmission-pattern indication indicating the retransmission pattern associated with the data packet and one or more other data packets.

Aspect 9: The method of any of Aspects 7-8, wherein the retransmission pattern is based at least in part on at least one of: a retransmission timer associated with the data packet and the one or more other data packets, a redundancy version index associated with the data packet and the one or more other data packets, or a corresponding hybrid automatic repeat request acknowledgement process identifier associated with each of the data packet and the one or more other data packets.

Aspect 10: The method of any of Aspects 1-9, wherein the one or more SPS configurations include a first SPS configuration and a second SPS configuration different from the first SPS configuration, wherein the data packet is originally transmitted in an SPS occasion associated with the first SPS configuration, and wherein the unused SPS occasion is associated with the second SPS configuration.

Aspect 11: The method of Aspect 10, further comprising receiving, by the mobile station and from the network node, a grouping indication indicating that the first SPS configuration and the second SPS configuration are grouped for purposes of retransmitting data packets in unused SPS occasions.

Aspect 12: The method of Aspect 11, wherein the grouping indication is based at least in part on at least one of a corresponding transmission priority associated with each of the first SPS configuration and the second SPS configuration, or a corresponding packet delay requirement associated with each of the first SPS configuration and the second SPS configuration.

Aspect 13: The method of any of Aspects 10-12, wherein the SPS occasion associated with the first SPS configuration is smaller than the unused SPS occasion, and wherein a coding gain associated with the retransmission of the data packet is greater than a coding gain associated with an original transmission of the data packet.

Aspect 14: The method of any of Aspects 10-12, wherein the SPS occasion associated with the first SPS configuration is larger than the unused SPS occasion, and wherein the retransmission of the data packet in the unused SPS occasion is based at least in part on puncturing the data packet.

Aspect 15: The method of any of Aspects 10-14, wherein the first SPS configuration is associated with a first component carrier, and wherein the second SPS configuration is associated with a second component carrier different from the first component carrier.

Aspect 16: The method of any of Aspects 1-15, further comprising receiving, by the mobile station and from the network node, a timer indication indicating a minimum period of time that must elapse between a transmission of a negative acknowledgement communication associated with the data packet and the retransmission of the data packet.

Aspect 17: The method of any of Aspects 1-16, wherein a cyclic redundancy check of the data packet is scrambled with a scrambling sequence indicating that the data packet is a retransmission of a previously transmitted data packet.

Aspect 18: The method of Aspect 17, wherein the scrambling sequence indicates at least one of a hybrid automatic repeat request acknowledgement process identifier associated with the previously transmitted data packet, or an SPS index associated with an SPS configuration, of the one or more SPS configurations, associated with the previously transmitted data packet.

Aspect 19: The method of any of Aspects 1-18, wherein the retransmission of the data packet is self-decodable.

Aspect 20: The method of any of Aspects 1-19, wherein the retransmission of the data packet is combinable with an original transmission of the data packet using a log likelihood ratio combination process.

Aspect 21: The method of Aspect 20, further comprising receiving, by the mobile station and from the network node, a combining indication indicating at least one of a redundancy version associated with the data packet, or a hybrid automatic repeat request acknowledgement process identifier associated with the data packet.

Aspect 22: A method of wireless communication performed by a network node, comprising: transmitting, by the network node and to a mobile station, one or more SPS configurations that configure multiple SPS occasions; and transmitting, by the network node and to the mobile station, a retransmission of a data packet in an unused SPS occasion, of the multiple SPS occasions.

Aspect 23: The method of Aspect 22, wherein the data packet is associated with an extended reality communication.

Aspect 24: The method of any of Aspects 22-23, further comprising transmitting, by the network node and to the mobile station, a retransmission indication indicating that the data packet is being retransmitted in the unused SPS occasion, wherein the retransmission indication is transmitted in the unused SPS occasion.

Aspect 25: The method of Aspect 24, wherein the retransmission indication indicates at least one of: a redundancy version index associated with the data packet, a hybrid automatic repeat request identifier associated with the data packet, additional resources associated with the retransmission of the data packet, or one or more other SPS configurations associated with the retransmission of the data packet.

Aspect 26: The method of any of Aspects 22-25, wherein the one or more SPS configurations indicate that unused SPS occasions may be used for retransmissions of data packets.

Aspect 27: The method of any of Aspects 22-26, further comprising transmitting, by the network node and to the mobile station, a skip indication indicating that the unused SPS occasion is being skipped.

Aspect 28: The method of Aspect 27, further comprising transmitting, by the network node and to the mobile station, a retransmission-pattern indication indicating a retransmission pattern associated with the data packet and one or more other data packets.

Aspect 29: The method of Aspect 28, wherein the retransmission pattern is based at least in part on at least one of: a retransmission timer associated with the data packet and the one or more other data packets, a redundancy version index associated with the data packet and the one or more other data packets, or a corresponding hybrid automatic repeat request acknowledgement process identifier associated with each of the data packet and the one or more other data packets.

Aspect 30: The method of any of Aspects 22-29, wherein the one or more SPS configurations include a first SPS configuration and a second SPS configuration different from the first SPS configuration, wherein the data packet is originally transmitted in an SPS occasion associated with the first SPS configuration, and wherein the unused SPS occasion is associated with the second SPS configuration.

Aspect 31: The method of Aspect 30, further comprising transmitting, by the network node and to the mobile station, a grouping indication indicating that the first SPS configuration and the second SPS configuration are grouped for purposes of retransmitting data packets in unused SPS occasions.

Aspect 32: The method of Aspect 31, wherein the grouping indication is based at least in part on at least one of a corresponding transmission priority associated with each of the first SPS configuration and the second SPS configuration, or a corresponding packet delay requirement associated with each of the first SPS configuration and the second SPS configuration.

Aspect 33: The method of any of Aspects 30-32, wherein the SPS occasion associated with the first SPS configuration is smaller than the unused SPS occasion, and wherein a coding gain associated with the retransmission of the data packet is greater than a coding gain associated with an original transmission of the data packet.

Aspect 34: The method of any of Aspects 30-32, wherein the SPS occasion associated with the first SPS configuration is larger than the unused SPS occasion, and wherein the retransmission of the data packet in the unused SPS occasion is based at least in part on puncturing the data packet.

Aspect 35: The method of any of Aspects 30-34, wherein the first SPS configuration is associated with a first component carrier, and wherein the second SPS configuration is associated with a second component carrier different from the first component carrier.

Aspect 36: The method of any of Aspects 22-35, further comprising transmitting, by the network node and to the mobile station, a timer indication indicating a minimum period of time that must elapse between a transmission of a negative acknowledgement communication associated with the data packet and the retransmission of the data packet.

Aspect 37: The method of any of Aspects 22-36, wherein a cyclic redundancy check of the data packet is scrambled with a scrambling sequence indicating that the data packet is a retransmission of a previously transmitted data packet.

Aspect 38: The method of Aspect 37, wherein the scrambling sequence indicates at least one of a hybrid automatic repeat request acknowledgement process identifier associated with the previously transmitted data packet, or an SPS index associated with an SPS configuration, of the one or more SPS configurations, associated with the previously transmitted data packet.

Aspect 39: The method of any of Aspects 22-38, wherein the retransmission of the data packet is self-decodable.

Aspect 40: The method of any of Aspects 22-39, wherein the retransmission of the data packet is combinable with an original transmission of the data packet using a log likelihood ratio combination process.

Aspect 41: The method of Aspect 40, further comprising transmitting, by the network node and to the mobile station, a combining indication indicating at least one of a redundancy version associated with the data packet, or a hybrid automatic repeat request acknowledgement process identifier associated with the data packet.

Aspect 42: An apparatus for wireless communication at a device, comprising a processor; memory coupled with the processor; and instructions stored in the memory and executable by the processor to cause the apparatus to perform the method of one or more of Aspects 1-21.

Aspect 43: A device for wireless communication, comprising a memory and one or more processors that, based at least in part on information stored in the memory, are configured to perform the method of one or more of Aspects 1-21.

Aspect 44: An apparatus for wireless communication, comprising at least one means for performing the method of one or more of Aspects 1-21.

Aspect 45: A non-transitory computer-readable medium storing code for wireless communication, the code comprising instructions executable by a processor to perform the method of one or more of Aspects 1-21.

Aspect 46: A non-transitory computer-readable medium storing a set of instructions for wireless communication, the set of instructions comprising one or more instructions that, when executed by one or more processors of a device, cause the device to perform the method of one or more of Aspects 1-21.

Aspect 47: An apparatus for wireless communication at a device, comprising a processor; memory coupled with the processor; and instructions stored in the memory and executable by the processor to cause the apparatus to perform the method of one or more of Aspects 22-41.

Aspect 48: A device for wireless communication, comprising a memory and one or more processors that, based at least in part on information stored in the memory, are configured to perform the method of one or more of Aspects 22-41.

Aspect 49: An apparatus for wireless communication, comprising at least one means for performing the method of one or more of Aspects 22-41.

Aspect 50: A non-transitory computer-readable medium storing code for wireless communication, the code comprising instructions executable by a processor to perform the method of one or more of Aspects 22-41.

Aspect 51: A non-transitory computer-readable medium storing a set of instructions for wireless communication, the set of instructions comprising one or more instructions that, when executed by one or more processors of a device, cause the device to perform the method of one or more of Aspects 22-41.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A mobile station for wireless communication, comprising:

one or more memories; and one or more processors that, based at least in part on information stored in the one or more memories, are configured to:

receive, from a network node, one or more semi-persistent scheduling (SPS) configurations that configure multiple SPS occasions;

receive, from the network node, a retransmission of a data packet in a skipped SPS occasion of the multiple SPS occasions; and receive, from the network node and in the skipped SPS occasion, downlink control information (DCI) piggybacked on the retransmission to indicate that the data packet is being retransmitted in the skipped SPS occasion.

2. The mobile station of claim 1, wherein the DCI piggybacked on the retransmission and further indicates at least one of:

a redundancy version index associated with the data packet, a hybrid automatic repeat request identifier associated with the data packet, additional resources associated with the retransmission of the data packet, or one or more other SPS configurations associated with the retransmission of the data packet.

3. The mobile station of claim 1, wherein the one or more SPS configurations indicate that skipped SPS occasion being optionally used for retransmissions of data packets.

4. The mobile station of claim 1, further comprising:

determine that the data packet is being retransmitted in the skipped SPS occasion based on the data packet being an earliest transmitted data packet for which a negative acknowledgment message was transmitted and for which retransmission has not yet occurred, or based on a retransmission pattern associated with the data packet and one or more other data packets.

5. The mobile station of claim 4, wherein the one or more processors are further configured to receive, from the network node, a retransmission-pattern indication indicating the retransmission pattern associated with the data packet and one or more other data packets.

6. The mobile station of claim 4, wherein the retransmission pattern is based at least in part on at least one of:

a retransmission timer associated with the data packet and the one or more other data packets, a redundancy version index associated with the data packet and the one or more other data packets, or a corresponding hybrid automatic repeat request acknowledgement process identifier associated with each of the data packet and the one or more other data packets.

7. The mobile station of claim 1, wherein the one or more SPS configurations include a first SPS configuration and a second SPS configuration different from the first SPS configuration, wherein the data packet is originally transmitted in an SPS occasion associated with the first SPS configuration, and wherein the skipped SPS occasion is associated with the second SPS configuration.

8. The mobile station of claim 7, wherein the one or more processors are further configured to receive, from the network node, a grouping indication indicating that the first SPS configuration and the second SPS configuration are grouped for purposes of retransmitting data packets in skipped SPS occasions.

9. The mobile station of claim 8, wherein the grouping indication is based at least in part on at least one of a corresponding transmission priority associated with each of the first SPS configuration and the second SPS configuration, or a corresponding packet delay requirement associated with each of the first SPS configuration and the second SPS configuration.

10. The mobile station of claim 7, wherein the SPS occasion associated with the first SPS configuration is smaller than the skipped SPS occasion, and wherein a coding gain associated with the retransmission of the data packet is greater than a coding gain associated with an original transmission of the data packet.

11. The mobile station of claim 7, wherein the SPS occasion associated with the first SPS configuration is larger than the skipped SPS occasion, and wherein the retransmission of the data packet in the skipped SPS occasion is based at least in part on puncturing the data packet.

12. The mobile station of claim 7, wherein the first SPS configuration is associated with a first component carrier, and wherein the second SPS configuration is associated with a second component carrier different from the first component carrier.

13. The mobile station of claim 1, wherein the one or more processors are further configured to receive, from the network node, a timer indication indicating a minimum period of time that must elapse between a transmission of a negative acknowledgement communication associated with the data packet and the retransmission of the data packet.

14. The mobile station of claim 1, wherein the one or more processors are further configured to receive, from the network node, a combining indication indicating at least one of a redundancy version associated with the data packet, or a hybrid automatic repeat request acknowledgement process identifier associated with the data packet.

15. A mobile station for wireless communication, comprising:

one or more memories; and one or more processors that, based at least in part on information stored in the one or more memories, are configured to:

receive, from a network node, one or more semi-persistent scheduling (SPS) configurations that configure multiple SPS occasions; and receive, from the network node, a retransmission of a data packet in a skipped SPS occasion of the multiple SPS occasions, wherein a cyclic redundancy check of the data packet is scrambled with a scrambling sequence, the scrambling sequence indicating that the data packet is a retransmission of a previously transmitted data packet.

16. The mobile station of claim 15, wherein the scrambling sequence indicates at least one of a hybrid automatic repeat request acknowledgement process identifier associated with the previously transmitted data packet, or an SPS index associated with an SPS configuration, of the one or more SPS configurations, associated with the previously transmitted data packet.

17. The mobile station of claim 15, wherein the one or more SPS configurations indicate the skipped SPS occasion being optionally used for retransmission of data packets.

* * * * *